*(12)* United States Patent
Kono et al.

(10) Patent No.: US 12,326,643 B2
(45) Date of Patent: Jun. 10, 2025

(54) LIGHT MODULATOR

(71) Applicant: Sumitomo Electric Industries, Ltd., Osaka (JP)

(72) Inventors: Naoya Kono, Osaka (JP); Hajime Tanaka, Osaka (JP); Naoki Fujiwara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 278 days.

(21) Appl. No.: 17/886,673

(22) Filed: Aug. 12, 2022

(65) Prior Publication Data

US 2023/0057015 A1 Feb. 23, 2023

(30) Foreign Application Priority Data

Aug. 20, 2021 (JP) .................................. 2021-134731
May 18, 2022 (JP) .................................. 2022-081605

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01)

(58) Field of Classification Search
CPC .......... G02F 1/025; G02F 1/212; G02F 1/218; G02F 1/225; G02F 1/2257
See application file for complete search history.

(56) References Cited

U.S. PATENT DOCUMENTS 7,565,038 B2 * 7/2009 Earnshaw ............. G02F 1/0147
385/1
12,044,569 B2 * 7/2024 Okimoto ............... G01J 3/0256
(Continued)

FOREIGN PATENT DOCUMENTS

JP 2013-235247 A 11/2013
WO WO-2004038764 A2 * 5/2004 ......... H01L 27/0605
(Continued)

OTHER PUBLICATIONS

Filmetrics. "Refractive Index of Si, Silicon." 2 pages. (Year: 2024).*
(Continued)

*Primary Examiner* — Daniel Petkovsek
*Assistant Examiner* — Emma R. Oxford
(74) *Attorney, Agent, or Firm* — Volpe Koenig

(57) ABSTRACT

The light modulator includes a substrate having a main surface including a first area, a second area, and a third area, a first III-V compound semiconductor layer of a first conductivity-type provided on the first area, a second III-V compound semiconductor layer of a first conductivity-type or a second conductivity-type provided on the second area, a core provided on the third area and including a group III-V compound semiconductor, and an electrode connected to the first III-V compound semiconductor layer. The first III-V compound semiconductor layer includes a first portion having a thickness smaller than a thickness of the core in a second direction orthogonal to the main surface and a second portion having a thickness larger than the thickness of the first portion in the second direction. The second portion is disposed between the first portion and the core.

17 Claims, 15 Drawing Sheets

(56) References Cited

U.S. PATENT DOCUMENTS

| | | | |
|---|---|---|---|
| 2012/0043527 A1* | 2/2012 | Ding | H01L 29/122 |
| | | | 977/761 |
| 2013/0209023 A1 | 8/2013 | Prosyk | |
| 2019/0278111 A1* | 9/2019 | Yu | G02B 6/136 |
| 2020/0012043 A1* | 1/2020 | Abediasl | G02B 6/12 |
| 2020/0124878 A1* | 4/2020 | Yu | G02F 1/225 |
| 2020/0341345 A1* | 10/2020 | Kono | G02F 1/011 |
| 2020/0400977 A1 | 12/2020 | Hiraki et al. | |
| 2024/0419048 A1* | 12/2024 | Tanaka | G02F 1/2257 |

FOREIGN PATENT DOCUMENTS

| | | |
|---|---|---|
| WO | 2019/148011 A1 | 8/2019 |
| WO | 2019/163559 A1 | 8/2019 |

OTHER PUBLICATIONS

Filmetrics. "Refractive Index of InGaAs, GaInAs, Indium Gallium Arsenide." 2 pages. (Year: 2024).*

* cited by examiner

LIGHT MODULATOR

CROSS REFERENCE TO RELATED APPLICATIONS

This application claims priority based on Japanese Patent Applications No. 2021-134731 filed on Aug. 20, 2021 and No. 2022-081605 filed on May 18, 2022, and the entire contents of the Japanese patent applications are incorporated herein by reference.

TECHNICAL FIELD

The present disclosure relates to a light modulator.

BACKGROUND

Patent Document 1 discloses a Mach-Zehnder modulator including a semi-insulating core layer and n-type InP layers located on both sides of the semi-insulating core layer. The semi-insulating core and the InP layers are provided on a substrate.

Patent Document 2 discloses a light modulator including a core and semiconductor layers located on both sides of the core. The core is made of an InP-based semiconductor. The core and the semiconductors layer are provided on a substrate.

[Patent Document 1] Japanese Unexamined Patent Application Publication No. 2013-235247
[Patent Document 2] WO 2019/163559

SUMMARY

A light modulator according to an aspect of the present disclosure includes a substrate having a main surface including a first area, a second area, and a third area, the first area, the second area, and the third area each extending in a first direction along the main surface, the third area being disposed between the first area and the second area, a first III-V compound semiconductor layer of a first conductivity-type disposed on the first area, a second III-V compound semiconductor layer of a first conductivity-type or second conductivity-type disposed on the second area, a core disposed on the third area and containing a III-V compound semiconductor, and an electrode connected to the first III-V compound semiconductor layer. The first III-V compound semiconductor layer includes a first portion having a thickness smaller than a thickness of the core in a second direction orthogonal to the main surface and a second portion having a thickness larger than the thickness of the first portion in the second direction, and the second portion is disposed between the first portion and the core.

DETAILED DESCRIPTION

Figure 1:
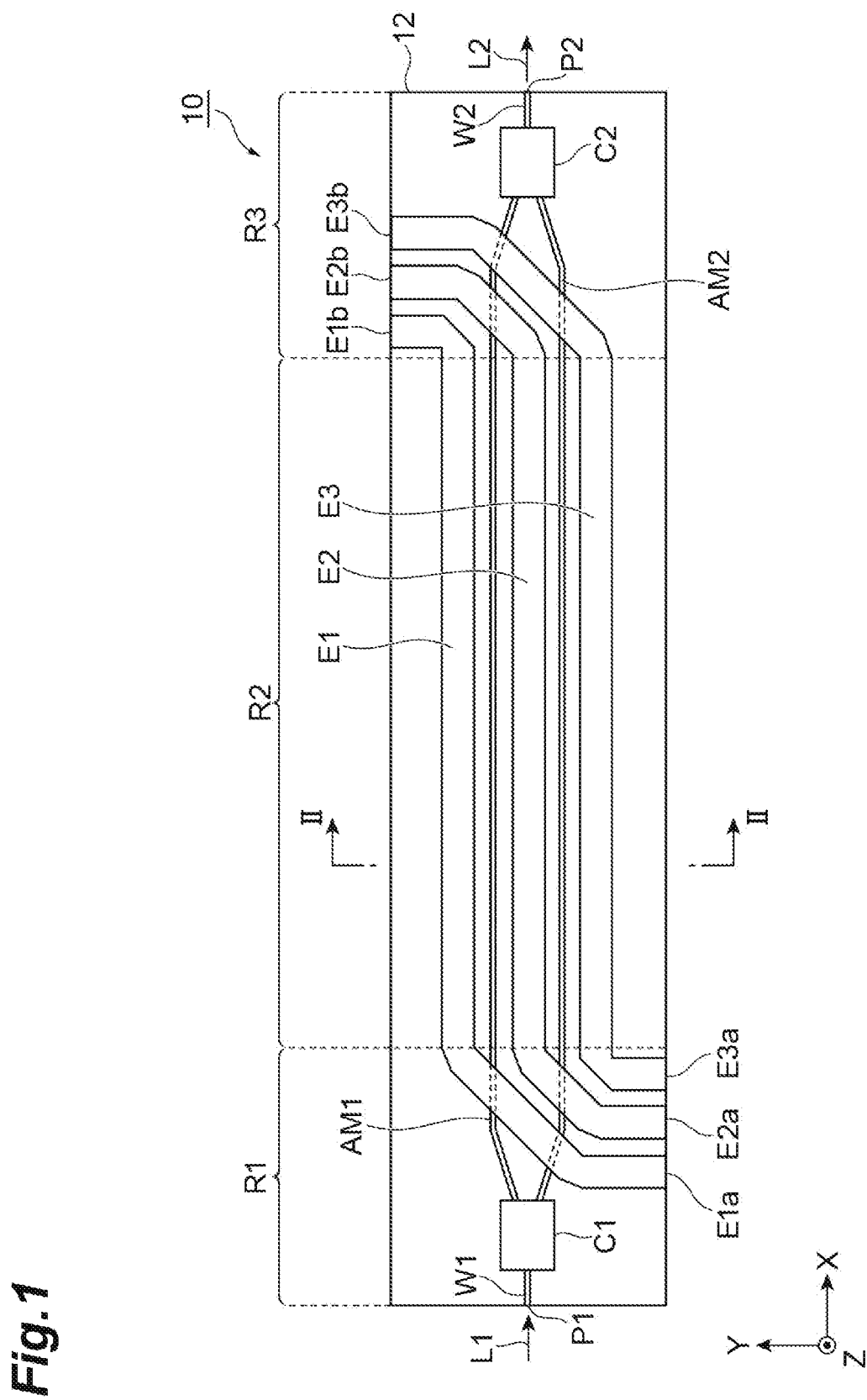
FIG. 1 is a plan view schematically showing a light modulator according to a first embodiment.

In Patent Document 1, since each of the n-type InP layers has a constant thickness equal to the thickness of the semi-insulating core layer, the amount of light leaking from the semi-insulating core layer to the n-type InP layers increases. Therefore, the optical confinement factor to the semi-insulating core layer cannot be increased.

In Patent Document 2, the thickness of a portion of the semiconductor layer that is in contact with the side surface of the core is smaller than the thickness of the core. Therefore, an electric field is less likely to be applied to the upper portion of the core that is not in contact with the semiconductor layer.

The present disclosure provides a light modulator having excellent optical confinement performance to a core and capable of applying an electric field to a wide region in the core.

DESCRIPTION OF EMBODIMENTS OF PRESENT DISCLOSURE (1) A light modulator according to an embodiment includes a substrate having a main surface including a first area, a second area, and a third area, the first area, the second area, and the third area each extending in a first direction along the main surface, the third area being disposed between the first area and the second area, a first III-V compound semiconductor layer of a first conductivity-type disposed on the first area, a second III-V compound semiconductor layer of a first conductivity-type or second conductivity-type disposed on the second area a core disposed on the third area and containing a III-V compound semiconductor, and an electrode connected to the first III-V compound semiconductor layer. The first III-V compound semiconductor layer includes a first portion having a thickness smaller than a thickness of the core in a second direction orthogonal to the main surface and a second portion having a thickness larger than the thickness of the first portion in the second direction, and the second portion is disposed between the first portion and the core.

According to the light modulator of the embodiment, since the first portion has the thickness smaller than the thickness of the core, excellent optical confinement performance to the core can be obtained. Further, since an electric field is applied to the core by the second portion, the electric field can be applied to a wide region in the core.

(2) In (1), the substrate may include a cladding portion located at the third area, and the cladding portion may have a refractive index smaller than a refractive index of the first III-V compound semiconductor layer. In this case, the optical confinement factor to the core can be increased.

(3) In (2), the cladding portion may include a void portion. In this case, the optical confinement factor to the core can be increased.

(4) In (3), the cladding portion may include a supporting portion supporting the core. In this case, the mechanical strength of the light modulator can be improved.

(5) In any one of (1) to (4), the second III-V compound semiconductor layer may have a first conductivity-type, and the first conductivity-type may be n-type. The light absorption coefficient and the electrical resistance of the n-type III-V compound semiconductor layer are smaller than the light absorption coefficient and the electrical resistance of the p-type III-V compound semiconductor layer. Therefore, the light absorption coefficient and the electrical resistance of the first III-V compound semiconductor layer and the second III-V compound semiconductor layer can be reduced.

(6) In any one of (1) to (4), the main surface may include a fourth area and a fifth area, the fourth area and the fifth area each extends in the first direction, and the fourth area is disposed between the second area and the fifth area. The core may be a first core. The light modulator may include a second core disposed on the fourth area and containing a III-V compound semiconductor, and a third III-V compound semiconductor layer of a first conductivity-type is disposed on the fifth area. The second III-V compound semiconductor layer may have a second conductivity-type. The first conductivity-type is n-type. The second conductivity-type is p-type. In this case, the length of the p-type second III-V compound semiconductor layer can be made relatively small in the third direction orthogonal to the first direction and the second direction.

(7) In any one of (1) to (6), the first portion may include a first layer and a second layer. The first layer may by disposed between the second layer and the substrate in the second direction. The second layer may include a III-V compound semiconductor different from a III-V compound semiconductor included in the first layer.

Details of Embodiments of Present Disclosure

Hereinafter, embodiments of the present disclosure will be described in detail with reference to drawings. In the description of the drawings, the same reference numerals are used for the same or equivalent elements, and redundant description is omitted. In the drawings, an X-axis direction, a Y-axis direction, and a Z-axis direction that intersect each other are illustrated as necessary. The X-axis direction, the Y-axis direction, and the Z-axis direction are orthogonal to each other, for example.

First Embodiment

Figure 2:
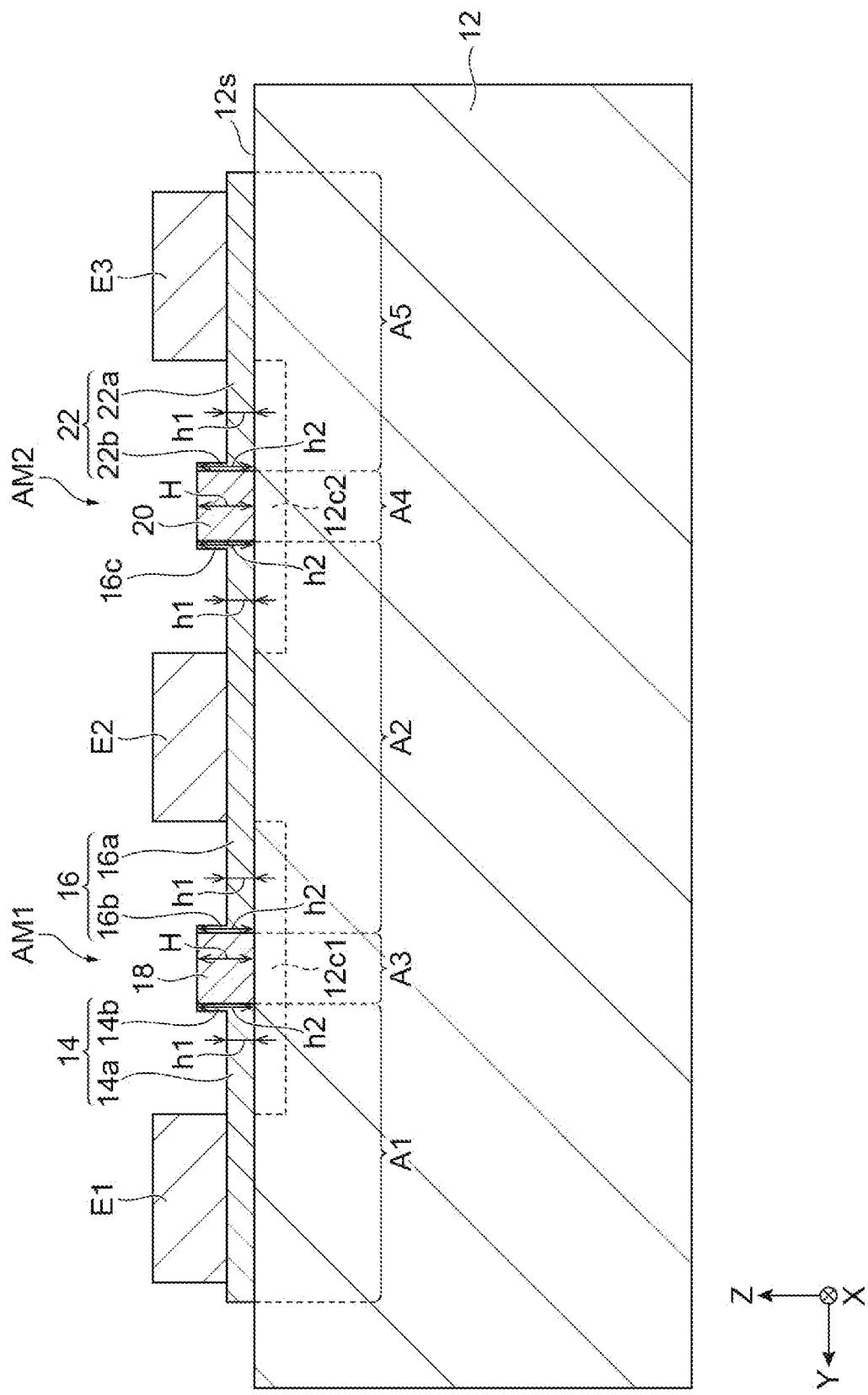
FIG. 2 is a cross-sectional view taken along line II-II of FIG. 1.

FIG. 1 is a plan view schematically showing a light modulator according to a first embodiment. FIG. 2 is a cross-sectional view taken along line II-II of FIG. 1. A Light modulator 10 shown in FIG. 1 and FIG. 2 is, for example, a Mach-Zehnder modulator. A light L1 input to light modulator 10 is output from light modulator 10 as a light L2. Light modulator 10 can modulate the intensity or phase of light in light communication, for example, and generate a modulated signal. Light modulator 10 may attenuate the light by, for example, adjusting the intensity of the light.

Light modulator 10 includes a substrate 12, a first III-V compound semiconductor layer 14 of a first conductivity-type, a second III-V compound semiconductor layer 16 of a first conductivity-type, and a first core 18. First core 18 is a nonconductivity-type III-V compound semiconductor layer. Light modulator 10 may include a second core 20 and a third III-V compound semiconductor layer 22 of the first conductivity-type. Second core 20 is a nonconductivity-type III-V compound semiconductor layer. The first conductivity-type is, for example, n-type. Examples of n-type dopants include Si.

Substrate 12 has a main surface 12s. Main surface 12s includes a first area A1, a second area A2, and a third area A3. Main surface 12s may include a fourth area A4 and a fifth area A5. Each of first area A1 to fifth area A5 extends in the X-axis direction. The X-axis direction is an example of a first direction along main surface 12s. The first direction along main surface 12s may be a curved direction. That is, each of first area A1 to fifth area A5 may extend in the curved direction. Third area A3 is disposed between first area A1 and second area A2. Fourth area A4 is disposed between second area A2 and fifth area A5. First area A1 to fifth area A5 may be disposed to be in contact with each other.

Substrate 12 may include a cladding portion 12c1 located under third area A3 of main surface 12s and a cladding portion 12c2 located under fourth area A4 of main surface 12s. Cladding portion 12c1 may be located under a portion of first area A1 and a portion of second area A2 of main surface 12s. Cladding portion 12c1 has a refractive index smaller than a refractive index of first III-V compound semiconductor layer 14. Each of the refractive indices is a refractive index at a wavelength λ of light L1. Cladding portion 12c2 may be located under a portion of second area A2 and a portion of fifth area A5 of main surface 12s. Cladding portion 12c2 has a refractive index smaller than a refractive index of third III-V compound semiconductor layer 22. In the present embodiment, the entire substrate 12 has a refractive index smaller than the refractive index of first III-V compound semiconductor layer 14. The refractive index of substrate 12 is, for example, less than 3. Substrate 12 may be an insulating substrate. Substrate 12 may be a silicon oxide substrate such as a glass substrate.

First core 18 is provided on third area A3. First core 18 forms a rib waveguide. An upper surface of first core 18 may be exposed. Thus, the upper surface of first core 18 is exposed to gas such as air. In this case, the air functions as a cladding portion of first core 18. Thus, the cladding portion on first core 18 has a refractive index smaller than the refractive index of first III-V compound semiconductor layer 14. First core 18 has a thickness H in the Z-axis direction. The Z-axis direction is an example of a second direction orthogonal to main surface 12s of substrate 12. The thickness H may be from 0.2 μm to 2 μm. A width of first core 18 in the Y-axis direction may be from 0.2 μm to 2 μm. First core 18 includes a group III-V compound semiconductor. First core 18 may include at least one of In and Ga as a group III element. First core 18 may include at least one of P and As as a group V element. Examples of the III-V compound semiconductors include InP, InGaAsP, AlInGaAs, GaAs, and AlGaAs. First core 18 may have a multiple quantum well structure. First core 18 includes a non-doped or semi-insulating group III-V compound semiconductor. First core 18 does not include an intentionally doped conductive dopant. First core 18 has a conductive dopant concentration that is less than the background concentration of unintentional doping. First core 18 has a conductive dopant concentration of, for example, $1 \times 10^{16}$ cm$^{-3}$ or less. First core 18 may include Fe (iron) as a semi-insulating dopant. The concentration of the semi-insulating dopant may be from $1 \times 10^{17}$ cm$^{-3}$ to $1 \times 10^{18}$ cm$^{-3}$. The upper surface of first core 18 may be a (100) plane, a (110) plane, or a (111) plane. When the upper surface of first core 18 is a (110) plane or a (111) plane, a high Pockels effect is obtained.

First III-V compound semiconductor layer 14 is provided on first area A1. First III-V compound semiconductor layer 14 includes a first portion 14a and a second portion 14b. Second portion 14b is disposed between first portion 14a and first core 18. Second portion 14b may be in contact with a side surface of first core 18. Each of first portion 14a and second portion 14b may extend in the X-axis direction. A width of second portion 14b in the Y-axis direction is smaller than a width of first portion 14a and the width of first core 18 in the Y-axis direction. The width of second portion 14b may be from 0.1 µm to 2 µm. First portion 14a has a thickness h1 smaller than the thickness H of first core 18 in the Z-axis direction. The thickness h1 may be from 0.1 µm to 1 µm. Second portion 14b has a thickness h2 larger than the thickness h1 of first portion 14a in the Z-axis direction. The thickness h2 may be equal to or less than the thickness H or may be equal to the thickness H. Examples of a III-V group compound semiconductors included in first III-V compound semiconductor layer 14 are the same as the examples of the III-V group compound semiconductors included in first core 18. A boundary between first III-V compound semiconductor layer 14 and first core 18 coincides with the boundary between first area A1 and third area A3.

Second III-V compound semiconductor layer 16 is provided on second area A2. Second III-V compound semiconductor layer 16 may include a first portion 16a, a second portion 16b, and a third portion 16c. Second portion 16b is disposed between first portion 16a and first core 18. Second portion 16b may be in contact with a side surface of first core 18. First portion 16a is disposed between second portion 16b and third portion 16c. Each of first portion 16a, second portion 16b, and third portion 16c may extend in the X-axis direction. A width of second portion 16b in the Y-axis direction is smaller than a width of first portion 16a and the width of first core 18 in the Y-axis direction. The width of second portion 16b may be from 0.1 µm to 2 µm. A width of third portion 16c in the Y-axis direction is smaller than the width of first portion 16a and the width of first core 18 in the Y-axis direction. The width of third portion 16c may be from 0.1 µm to 2 µm. First portion 16a has a thickness h1 smaller than the thickness H of first core 18 in the Z-axis direction. Second portion 16b has a thickness h2 larger than the thickness h1 of first portion 16a in the Z-axis direction. Third portion 16c has a thickness h2 larger than the thickness h1 of first portion 16a in the Z-axis direction. Examples of the III-V group compound semiconductors included in second III-V compound semiconductor layer 16 include examples of the III-V group compound semiconductor included in first core 18. A boundary between second III-V compound semiconductor layer 16 and first core 18 coincides with the boundary between second area A2 and third area A3.

Second core 20 is provided on fourth area A4. Second core 20 has the same configuration as first core 18. Third portion 16c of second III-V compound semiconductor layer 16 may be in contact with the side surface of second core 20.

Third III-V compound semiconductor layer 22 is provided on fifth area A5. Third III-V compound semiconductor layer 22 includes a first portion 22a and a second portion 22b. Second portion 22b is disposed between first portion 22a and second core 20. Second portion 22b may in contact with a side surface of second core 20. Each of first portion 22a and second portion 22b may extend in the X-axis direction. A width of second portion 22b in the Y-axis direction is smaller than a width of first portion 22a and the width of second core 20 in the Y-axis direction. The width of second portion 22b may be from 0.1 µm to 2 µm. First portion 22a has a thickness h1 smaller than a thickness H of second core 20 in the Z-axis direction. Second portion 22b has a thickness h2 larger than the thickness h1 of first portion 22a in the Z-axis direction. Examples of the III-V group compound semiconductor included in third III-V compound semiconductor layer 22 include examples of the III-V group compound semiconductor included in first core 18.

Light modulator 10 includes an electrode E1 connected to first III-V compound semiconductor layer 14. Electrode E1 may be connected to first portion 14a. Electrode E1 may be away from second portion 14b. Light modulator 10 may include an electrode E2 connected to second III-V compound semiconductor layer 16. Electrode E2 may be connected to first portion 16a. Electrode E2 may be away from second portion 16b and third portion 16c. Light modulator 10 may include an electrode E3 connected to third III-V compound semiconductor layer 22. Electrode E3 may be connected to first portion 22a. Electrode E3 may be away from second portion 22b. Each of electrodes E1 to E3 may include a metal. Each of electrodes E1 to E3 may extend in the X-axis direction. A width of each of electrodes E1 to E3 in the Y-axis direction may be from 5 µm to 100 µm. A thickness of each of electrodes E1 to E3 in the Z-axis direction may be from 1 µm to 10 µm. A distance between electrode E1 and second portion 14b of first III-V compound semiconductor layer 14 may be from 1 µm to 5 µm. A distance between electrode E2 and second portion 16b of second III-V compound semiconductor layer 16 may be from 1 µm to 5 µm. A distance between electrode E2 and third portion 16c of second III-V compound semiconductor layer 16 may be from 1 µm to 5 µm. A distance between electrode E3 and second portion 22b of third III-V compound semiconductor layer 22 may be from 1 µm to 5 µm.

When light modulator 10 has a GSG (Ground Signal Ground) structure, a high-frequency voltage is applied to electrode E2 as a driving voltage, and a ground potential is applied to electrode E1 and electrode E3. When light modulator 10 has an SGS (Signal Ground Signal) structure, a high-frequency voltage is applied as a driving voltage to electrode E1 and electrode E3, and a ground potential is applied to electrode E2. In this case, a differential signal is applied to electrode E1 and electrode E3. That is, high-frequency voltages having phases opposite to each other are applied to electrode E1 and electrode E3. An amplitude of the high frequency voltage applied to light modulator 10 may be from 0.5 V to 10 V.

Electrode E1 may have a first end portion E1a located at a first edge of main surface 12s of substrate 12 and a second end portion E1b located at a second edge of main surface 12s of substrate 12. The second edge is located opposite the first edge. The first edge and the second edge extend in the X-axis direction. Electrode E2 may have a first end portion E2a located at the first edge and a second end portion E2b located at the second edge. Electrode E3 may have a first end portion E3a located at the first edge and a second end portion E3b located at the second edge. An electrical signal from a driving circuit may be input to at least one of first end portion E1a, first end portion E2a, and first end portion E3a. The electrical signal may be output from at least one of second end portion E1b, second end portion E2b, and second end portion E3b.

Light modulator 10 may include a first region R1, a second region R2, and a third region R3. First region R1, second region R2, and third region R3 are arranged in the X-axis direction. Second region R2 is disposed between first region R1 and third region R3. First region R1 functions as an input unit of light and an electrical signal. Second region R2 functions as a modulation unit. Third region R3 functions as an output unit of light and an electrical signal. FIG. 2 shows a cross section of light modulator 10 in second region R2. First area A1 to fifth area A5 may extend in second region R2 along the X-axis direction from a boundary between first region R1 and second region R2 to a boundary between second region R2 and third region R3, for example.

First core 18 may function as a first arm waveguide AM1 of a Mach-Zehnder modulator. Second core 20 may function as a second arm waveguide AM2 of the Mach-Zehnder modulator. In second region R2, each of first arm waveguide AM1 and second arm waveguide AM2 extends in the X-axis direction. An extending direction in which second arm waveguide AM2 extends may be different from an extending direction in which first arm waveguide AM1 extends. Specifically, an angle formed by the extending direction of first arm waveguide AM1 and the extending direction of second arm waveguide AM2 may be, for example, 0° or more and 20° or less. First arm waveguide AM1 and second arm waveguide AM2 are spaced apart from each other in the Y-axis direction.

In first region R1, input ends of first arm waveguide AM1 and second arm waveguide AM2 are optically coupled to two output ends of an optical demultiplexer C1, respectively. Optical demultiplexer C1 is a multi-mode interference (MMI) coupler such as a 1×2 multi-mode interference coupler. An input end of optical demultiplexer C1 is optically coupled to an output end of an input waveguide W1. An input end of input waveguide W1 is an input port P1. Input port P1 is located at a third edge of main surface 12s of substrate 12. The third edge extends in the Y-axis direction. Light L1 is input to input port P1. The wavelength λ of light L1 may be from 1 μm to 2 μm. The wavelength λ of light L1 is, for example, 1.3 μm or 1.55 μm.

In third region R3, output ends of first arm waveguide AM1 and second arm waveguide AM2 are optically coupled to two input ends of an optical multiplexer C2, respectively. Optical multiplexer C2 is an MMI coupler such as a 2×1 multi-mode interference coupler. An output end of optical multiplexer C2 is optically coupled to an input end of an output waveguide W2. An output end of output waveguide W2 is an output port P2. Output port P2 is located at a fourth edge of main surface 12s of substrate 12. The fourth edge extends in the Y-axis direction. The fourth edge is located opposite the third edge. Light L2 modulated by light modulator 10 is output from output port P2.

The 3-dB band of light modulator 10 may be from 20 GHz to 100 GHz. The transmission rate of light modulator 10 may be from 25 Gbps to 128 Gbps.

According to light modulator 10 of the present embodiment, since first portion 14a and first portion 16a have thicknesses h1 smaller than the thicknesses H of first core 18, excellent optical confinement performance to first core 18 can be obtained. Further, since the electric field is applied to first core 18 by second portion 14b and second portion 16b, the electric field can be applied to a wide region in first core 18. Similarly, since first portion 16a and first portion 22a have thicknesses h1 smaller than the thicknesses H of second core 20, excellent optical confinement performance to second core 20 can be obtained. Further, since the electric field is applied to second core 20 by third portion 16c and second portion 22b, the electric field can be applied to a wide region in second core 20. Therefore, according to light modulator 10, since the region where the light and the electric field overlap each other can be enlarged in each of first core 18 and second core 20, the modulation efficiency can be improved.

When cladding portion 12c1 has a refractive index smaller than the refractive index of first III-V compound semiconductor layer 14, an optical confinement factor to first core 18 may be increased. Further, since the parasitic capacitance due to cladding portion 12c1 can be reduced, a modulation bandwidth of light modulator 10 can be expanded. When cladding portion 12c2 has a refractive index smaller than the refractive index of third III-V compound semiconductor layer 22, the optical confinement factor to second core 20 may be increased. Further, since the parasitic capacitance due to cladding portion 12c2 can be reduced, the modulation bandwidth of light modulator 10 can be expanded.

A light absorption coefficient and an electrical resistance of the n-type III-V compound semiconductor layer are smaller than a light absorption coefficient and an electrical resistance of the p-type III-V compound semiconductor layer. Therefore, when first III-V compound semiconductor layer 14 and second III-V compound semiconductor layer 16 have the n-type, the light absorption coefficient and the electrical resistance of each of first III-V compound semiconductor layer 14 and second III-V compound semiconductor layer 16 can be reduced. When third III-V compound semiconductor layer 22 has the n-type, the light absorption coefficient and electrical resistance of third III-V compound semiconductor layer 22 can be reduced. Therefore, the light loss of light modulator 10 can be reduced, and the modulation bandwidth of light modulator 10 can be widened.

Figure 3:
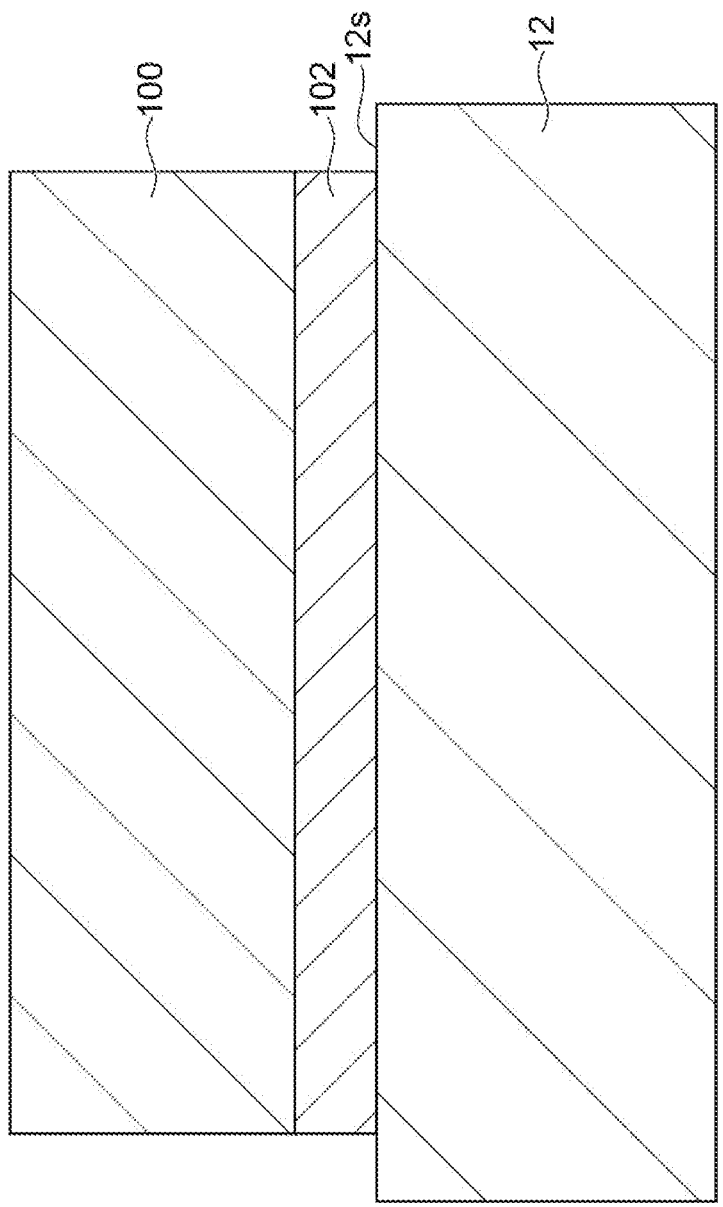
FIG. 3 is a cross-sectional view schematically showing one step of a method for manufacturing the light modulator according to the first embodiment.
Figure 4:
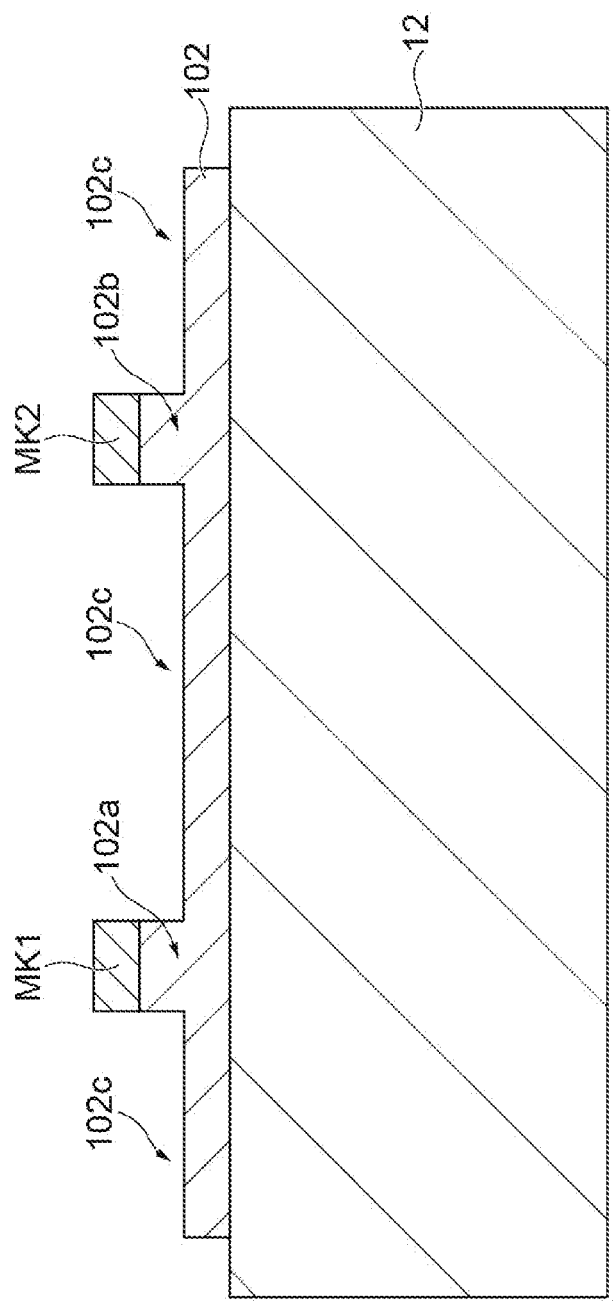
FIG. 4 is a cross-sectional view schematically showing one step of a method for manufacturing the light modulator according to the first embodiment.
Figure 5:
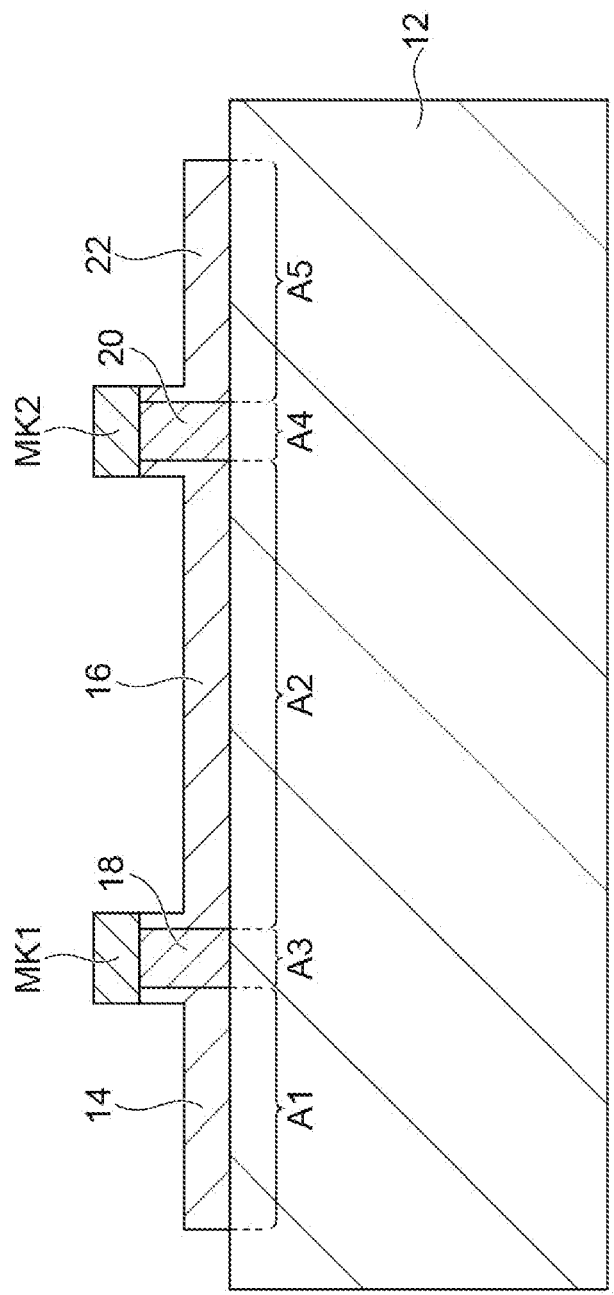
FIG. 5 is a cross-sectional view schematically showing one step of a method for manufacturing the light modulator according to the first embodiment.

FIG. 3 to FIG. 5 are cross-sectional views each schematically showing one step of the method for manufacturing the light modulator according to the first embodiment. Light modulator 10 may be manufactured by the following method.

First, as shown in FIG. 3, a III-V compound semiconductor layer 102 including a non-doped or semi-insulating group III-V compound semiconductor is formed on a III-V compound semiconductor substrate 100. III-V compound semiconductor substrate 100 may be, for example, InP substrate or GaAs substrate. III-V compound semiconductor layer 102 may be epitaxially grown by, for example, organometallic vapor phase epitaxy (OMVPE) or molecular beam epitaxy (MBE).

Next, as shown in FIG. 3, a surface of III-V compound semiconductor layer 102 is bonded to main surface 12s of substrate 12. The bonding may be performed by a direct bonding method. Thereafter, III-V compound semiconductor substrate 100 is removed. For example, III-V compound semiconductor substrate 100 may be removed by wet etching. Alternatively, III-V compound semiconductor substrate 100 may be removed by heating a fragile layer (implanted layer) formed by ion implantation in advance between III-V compound semiconductor substrate 100 and III-V compound semiconductor layer 102.

Next, as shown in FIG. 4, a mask MK1 for forming first core 18 and a mask MK2 for forming second core 20 are formed on III-V compound semiconductor layer 102. Each of mask MK1 and mask MK2 may be an insulating film. Masks MK1 and MK2 may be patterned by photolithography and etching. By etching III-V compound semiconductor layer 102 using masks MK1 and MK2, a recess 102c is formed in III-V compound semiconductor layer 102. Under mask MK1, a rib 102a is formed between recesses 102c. Under mask MK2, a rib 102b is formed between recesses 102c. The etching may be wet etching or dry etching. III-V compound semiconductor layer 102 may include an etching stop layer. In this case, an upper surface of the etching stop layer becomes a bottom surface of each recess 102c. Examples of the group III-V compound semiconductor included in the etching stop layer include InP.

Next, as shown in FIG. 5, a first conductivity-type dopant is implanted into III-V compound semiconductor layer 102 using mask MK1 and mask MK2. Dopants may be implanted into the bottom surface and side surfaces of recess 102c. As a result, first III-V compound semiconductor layer 14, second III-V compound semiconductor layer 16, first core 18, second core 20, and third III-V compound semiconductor layer 22 are formed. The dopant may be implanted by ion implantation or thermal diffusion. Thereafter, mask MK1 and mask MK2 are removed. Next, as shown in FIG. 2, electrodes E1 to E3 are formed.

Second Embodiment

Figure 6:
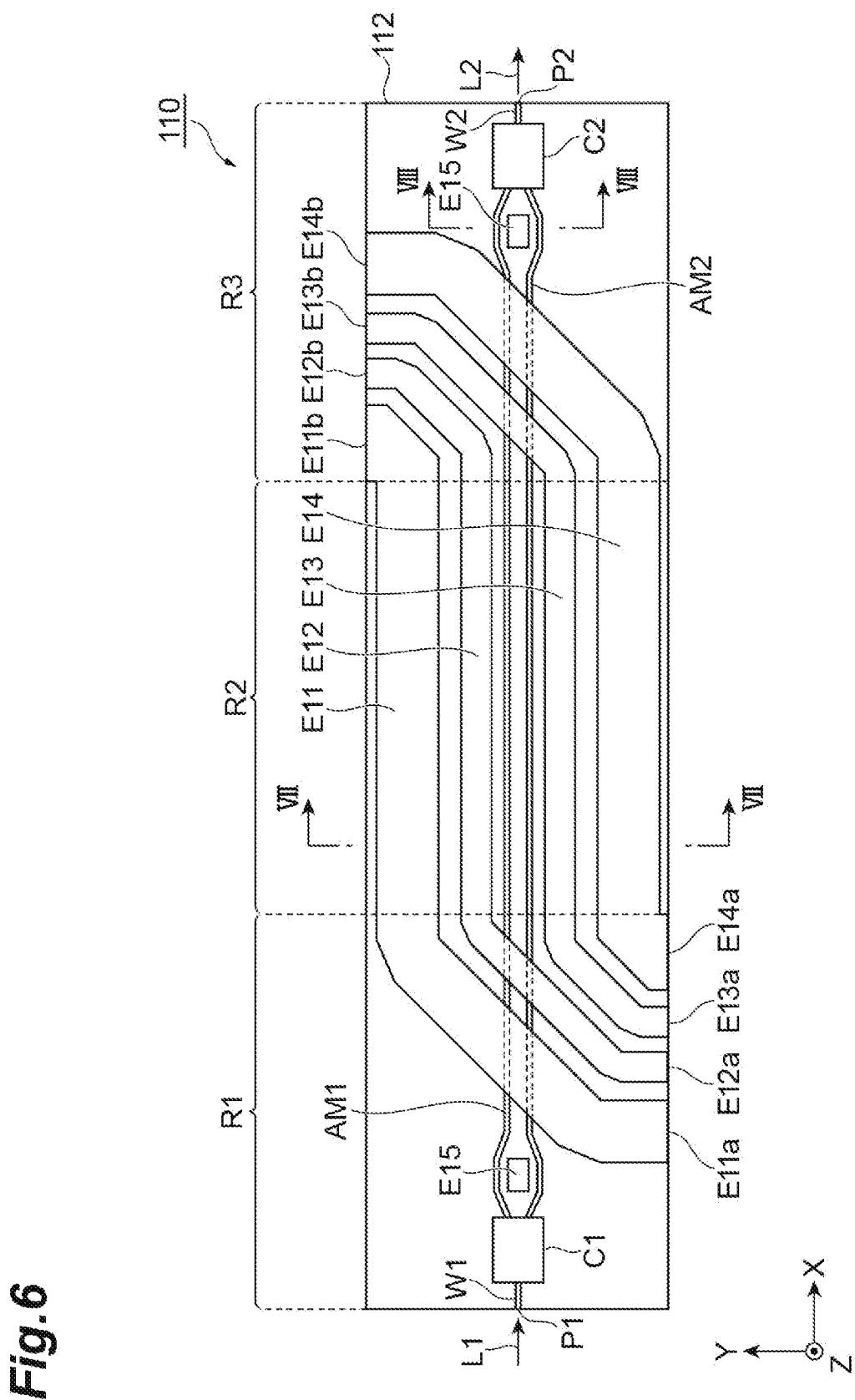
FIG. 6 is a plan view schematically showing a light modulator according to a second embodiment.
Figure 7:
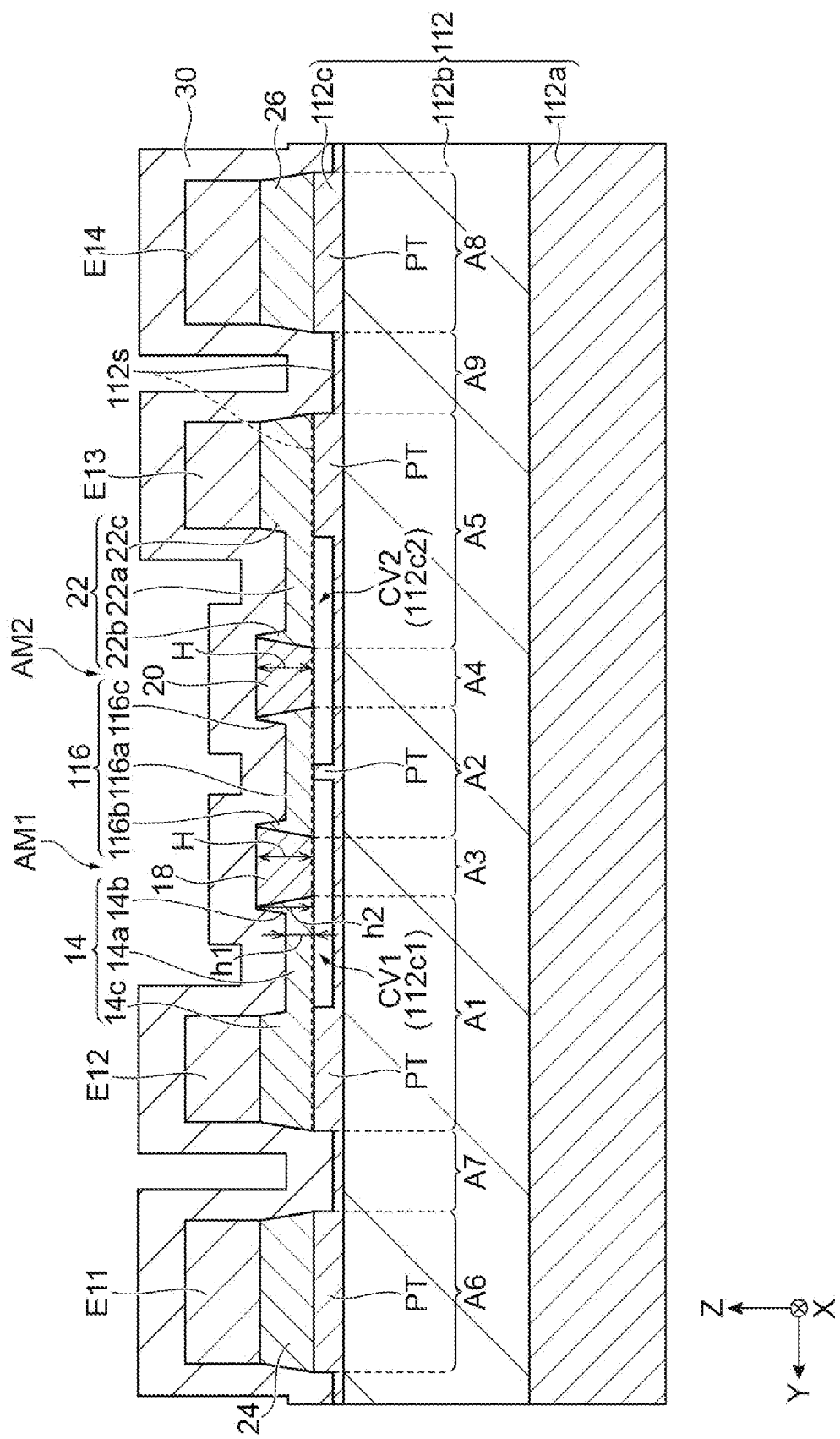
FIG. 7 is a cross-sectional view taken along line VII-VII of FIG. 6.
Figure 8:
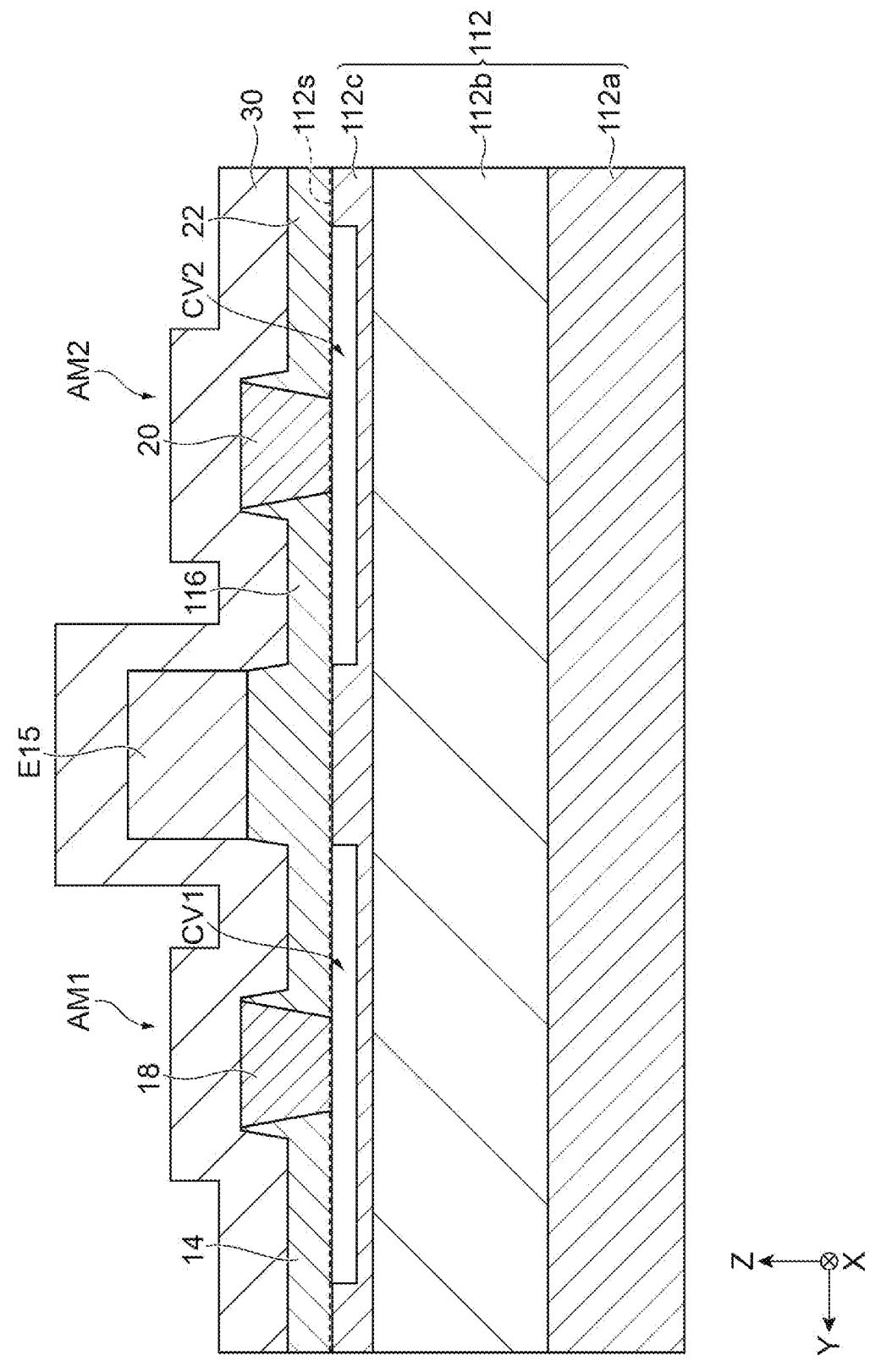
FIG. 8 is a cross-sectional view taken along line VIII-VIII of FIG. 6.

FIG. 6 is a plan view schematically showing a light modulator according to a second embodiment. FIG. 7 is a cross-sectional view taken along line VII-VII of FIG. 6. FIG. 8 is a cross-sectional view taken along line VIII-VIII of FIG. 6. A Light modulator 110 shown in FIG. 6 to FIG. 8 is, for example, a Mach-Zehnder modulator. FIG. 7 shows a cross section of light modulator 110 in second region R2. FIG. 8 shows a cross section of light modulator 110 in third region R3.

Light modulator 110 includes a substrate 112, first III-V compound semiconductor layer 14 of a first conductivity-type, a second III-V compound semiconductor layer 116 of a second conductivity-type, and first core 18. Light modulator 110 may include third III-V compound semiconductor layer 22 of a first conductivity-type and second core 20. The first conductivity-type is, for example, n-type. The second conductivity-type is, for example, p-type. An example of a p-type dopant includes Zn. Light modulator 110 may include a III-V compound semiconductor layer 24 of a first conductivity-type and a III-V compound semiconductor layer 26 of a first conductivity-type. Light modulator 110 may include an insulating film 30. In FIG. 6, insulating film 30 is omitted.

Substrate 112 has a main surface 112s. Main surface 112s includes first area A1 to fifth area A5. Main surface 112s may include a sixth area A6, a seventh area A7, an eighth area A8, and a ninth area A9. Each of sixth area A6 to ninth area A9 extends in the X-axis direction. Seventh area A7 is arranged between first area A1 and sixth area A6. Ninth area A9 is disposed between fifth area A5 and eighth area A8. First area A1 to ninth area A9 may be disposed to be in contact with each other.

Substrate 112 may be a silicon-on-insulator (SOI) substrate. Substrate 112 may include a semiconductor substrate 112a, an insulating layer 112b on semiconductor substrate 112a, and a cladding layer 112c on insulating layer 112b. Cladding layer 112c has main surface 112s. Semiconductor substrate 112a is, for example, a silicon substrate. Insulating layer 112b is, for example, a silicon oxide layer. Cladding layer 112c may have a protruding pattern portion PT. Cladding layer 112c includes, for example, a patterned semiconductor layer. The semiconductor layer is, for example, a silicon layer. In at least one of first region R1 and third region R3 of light modulator 110, pattern portion PT may be optically coupled to at least one of first core 18 and second core 20. Pattern portion PT may be a light waveguide forming a light circuit.

Cladding layer 112c may include a cladding portion 112c1 located under third area A3. Cladding portion 112c1 may be in contact with first core 18. Cladding portion 112c1 may be in contact with first portion 14a and second portion 14b of first III-V compound semiconductor layer 14. Cladding portion 112c1 may be in contact with a first portion 116a and a second portion 116b of second III-V compound semiconductor layer 116. Cladding portion 112c1 may be a void portion CV1. Void portion CV1 has a refractive index smaller than the refractive index of first III-V compound semiconductor layer 14. Void portion CV1 may be filled with a material having a refractive index smaller than the refractive index of first III-V compound semiconductor layer 14.

Cladding layer 112c may include a cladding portion 112c2 located under fourth area A4. Cladding portion 112c2 may be in contact with second core 20. Cladding portion 112c2 may be in contact with first portion 22a and second portion 22b of third III-V compound semiconductor layer 22. Cladding portion 112c2 may be in contact with first portion 116a and a third portion 116c of second III-V compound semiconductor layer 116. Cladding portion 112c2 may be a void portion CV2. Void portion CV2 has a refractive index smaller than the refractive index of third III-V compound semiconductor layer 22. Void portion CV2 may be filled with a material having a refractive index smaller than the refractive index of third III-V compound semiconductor layer 22.

Void portions CV1 and CV2 may be recesses formed between pattern portions PT in cladding layer 112c. Pattern portion PT may be located between void portion CV1 and void portion CV2.

First III-V compound semiconductor layer 14 may include a third portion 14c in addition to first portion 14a and second portion 14b. First portion 14a is disposed between second portion 14b and third portion 14c. Third portion 14c has a thickness h2 larger than a thickness h1 of first portion 14a in the Z-axis direction. Third portion 14c may be provided on pattern portion PT. An electrode E12 is connected to third portion 14c. Electrode E12 may be away from first portion 14a and second portion 14b. When third portion 14c is thicker, electrode E12 can be located farther from first core 18. Therefore, it is possible to reduce light loss caused by overlapping of the light field with electrode E12. A side surface of first core 18 may be inclined from a direction normal to a bottom surface of first core 18 so that a cross section orthogonal to X-axis direction of first core 18 has an inverse tapered shape. That is, a side surface of second portion 14b may be inclined from the direction normal to the bottom surface of the first core 18 so that second portion 14b has a tapered shape in its cross section orthogonal to X-axis direction.

Second III-V compound semiconductor layer 116 has the same configuration as the configuration of second III-V compound semiconductor layer 16 except for the conductivity-type and inclinations of side surfaces. Second III-V compound semiconductor layer 116 may include first portion 116a, second portion 116b, and third portion 116c.

Second portion 116b is disposed between first portion 116a and first core 18. Second portion 116b may be in contact with the side surface of first core 18. The side surface of first core 18 may be inclined from a direction normal to a bottom surface of first core 18 so that the cross section orthogonal to X-axis direction of first core 18 has an inverse tapered shape. That is, the side surface of second portion 116b may be inclined from the direction normal to the bottom surface of the first core 18 so that the cross section orthogonal to X-axis direction of second portion 116b has a tapered shape. First portion 116a is disposed between second portion 116b and third portion 116c. Third portion 116c may be in contact with a side surface of second core 20. The side surface of second core 20 may be inclined from the direction normal to the bottom surface of the second core 20 so that the cross section orthogonal to X-axis direction of second core 20 has an inverse tapered shape. That is, a side surface of third portion 116c may be inclined from the direction normal to the bottom surface of the second core 20 so that the cross section orthogonal to X-axis direction of third portion 116c has a tapered shape. First portion 116a has a thickness h1 smaller than the thickness H of first core 18 in the Z-axis direction. Second portion 116b has a thickness h2 larger than the thickness h1 of first portion 116a in the Z-axis direction. Third portion 116c has a thickness h1 larger than the h2 of first portion 116a in the Z-axis direction. In the Y-axis direction, a length of p-type second III-V compound semiconductor layer 116 is smaller than a total length of n-type first III-V compound semiconductor layer 14 and n-type third III-V compound semiconductor layer 22. An example of the III-V group compound semiconductor included in second III-V compound semiconductor layer 116 is the same as the example of the III-V group compound semiconductor included in second III-V compound semiconductor layer 16.

Third III-V compound semiconductor layer 22 may include a third portion 22c in addition to first portion 22a and second portion 22b. First portion 22a is disposed between second portion 22b and third portion 22c. Third portion 22c has a thickness h2 larger than a thickness h1 of first portion 22a in the Z-axis direction. Third portion 22c may be provided on pattern portion PT. An electrode E13 is connected to third portion 22c. When third portion 22c is thicker, electrode E13 can be separated farther from second core 20. Therefore, it is possible to reduce light loss caused by overlapping of the light field with electrode E13. A side surface of second core 20 may be inclined from a direction normal to a bottom surface of second core 20 so that a cross section orthogonal to X-axis direction of second core 20 has an inverse tapered shape. That is, the side surface of second portion 22b may be inclined from a direction normal to a bottom surface of second core 20 so that a cross section orthogonal to X-axis direction of second core 20 has a tapered shape.

III-V compound semiconductor layer 24 is provided on sixth area A6. III-V compound semiconductor layer 24 may be provided on pattern portion PT. An Electrode E11 is connected to III-V compound semiconductor layer 24.

III-V compound semiconductor layer 26 is provided on eighth area A8. III-V compound semiconductor layer 26 may be provided on pattern portion PT. An electrode E14 is connected to III-V compound semiconductor layer 26.

Insulating film 30 may cover first III-V compound semiconductor layer 14, second III-V compound semiconductor layer 116, first core 18, second core 20, and third III-V compound semiconductor layer 22. Insulating film 30 may cover electrodes E11 to E14. Examples of insulating materials included in insulating film 30 include $SiO_2$, $SiN_x$, $Al_2O_3$, and AlN.

Light modulator 110 may include electrodes E11 to E15. Each of electrodes E11 to E15 may include a metal. In second region R2, each of electrodes E11 to E14 may extend in the X-axis direction. Electrodes E11 to E14 may be sequentially arranged in the Y-axis direction. Electrode E12 may be disposed between electrode E11 and electrode E13. Electrode E13 may be disposed between electrode E12 and electrode E14. An electrode E15 is connected to second III-V compound semiconductor layer 116. Electrode E15 is disposed between first core 18 and second core 20 in each of first region R1 and third region R3.

When light modulator 110 has a GSSG (Ground Signal Signal Ground) structure, a high-frequency voltage is applied as a driving voltage to electrode E12 and electrode E13, and a ground potential is applied to electrode E11 and electrode E14. In this case, a differential signal is applied to electrode E12 and electrode E13. That is, high-frequency voltages having phases opposite to each other are applied to electrode E12 and electrode E13. A bias voltage may be applied to electrode E15. The bias voltage may be a negative voltage. The absolute value of the bias voltage may be from 5 V to 20 V.

Electrode E11 may have a first end portion E11a located at a first edge of main surface 112s of substrate 112 and a second end portion E11b located at a second edge of main surface 112s of substrate 112. Electrode E12 may have a first end portion E12a located at a first edge and a second end portion E12b located at a second edge. Electrode E13 may have a first end portion E13a located at a first edge and a second end portion E13b located at a second edge. Electrode E14 may have a first end portion E14a located at a first edge and a second end portion E14b located at a second edge. An electrical signal from the driving circuit may be input to first end portion E12a and first end portion E13a. The electrical signal may be output from second end portion E12b and second end portion E13b.

According to light modulator 110 of the present embodiment, since first portion 14a and first portion 116a have thicknesses h1 smaller than the thicknesses H of first core 18, excellent optical confinement performance to first core 18 can be obtained. Further, since the electric field is applied to first core 18 by second portion 14b and second portion 116b, the electric field can be applied to a wide region in first core 18. Similarly, since first portion 116a and first portion 22a have thicknesses h1 smaller than the thicknesses H of second core 20, excellent optical confinement performance to second core 20 can be obtained. Further, since the electric field is applied to second core 20 by third portion 116c and second portion 22b, the electric field can be applied to a wide region in second core 20.

When cladding layer 112c includes void portion CV1, the optical confinement factor to first core 18 may be increased. When cladding layer 112c includes void portion CV2, the optical confinement factor to second core 20 may be increased.

Second III-V compound semiconductor layer 116 may have a p-type, and each of first III-V compound semiconductor layer 14 and third III-V compound semiconductor layer 22 may have an n-type. In this case, the length of p-type second III-V compound semiconductor layer 116 in the Y-axis direction can be made relatively small. Therefore, the light absorption coefficient and the electrical resistance of second III-V compound semiconductor layer 116 can be reduced.

Third Embodiment

Figure 9:
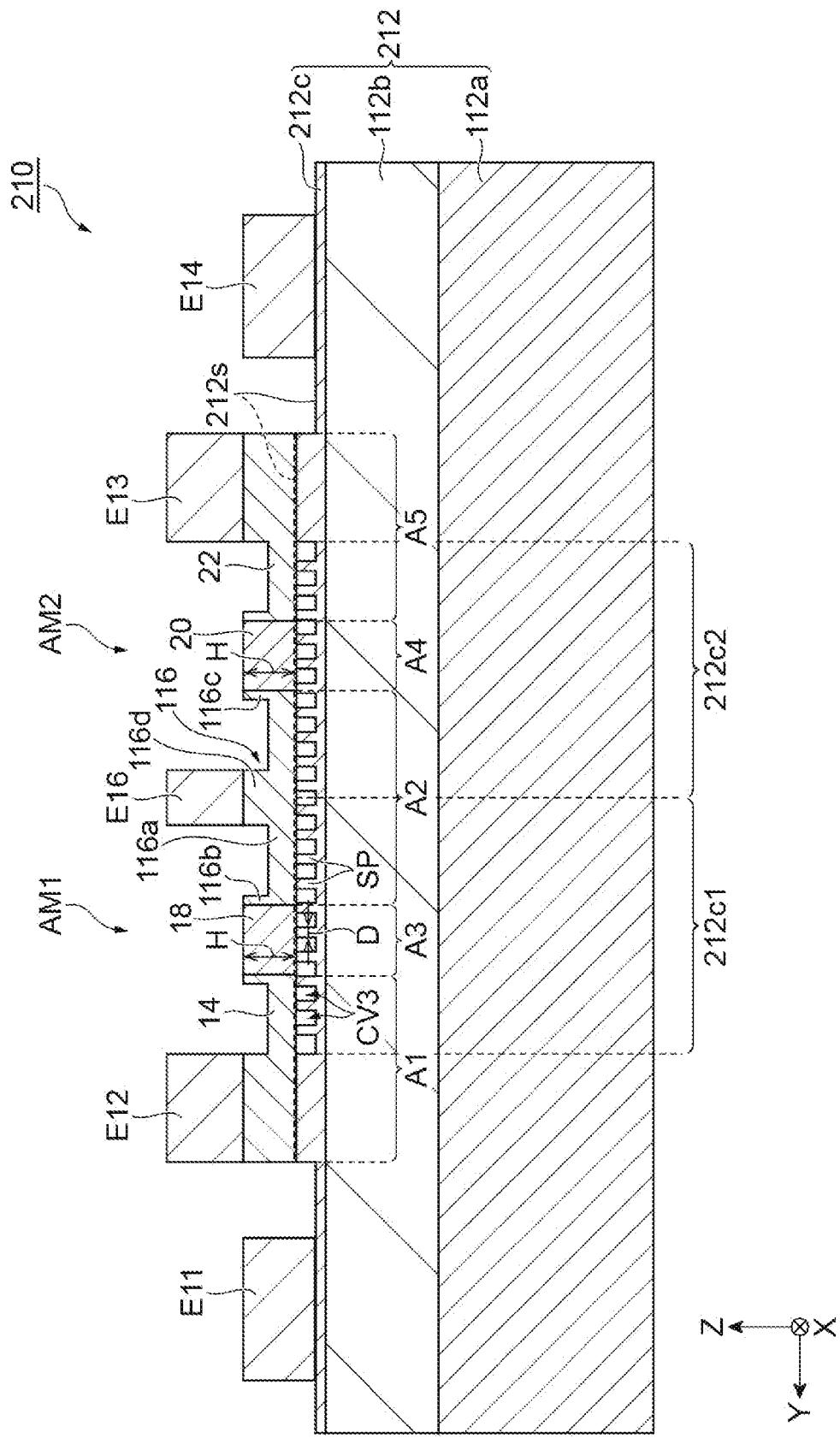
FIG. 9 is a cross-sectional view schematically showing a light modulator according to a third embodiment.

FIG. 9 is a cross-sectional view schematically showing a light modulator according to a third embodiment. A light modulator 210 shown in FIG. 9 has the same configuration as light modulator 110 except for the following points. Light modulator 210 includes a substrate 212 instead of substrate 112. Substrate 212 has the same configuration as the configuration of substrate 112 except that a cladding layer 212c is provided instead of cladding layer 112c. Cladding layer 212c has a main surface 212s of substrate 212. Main surface 212s has first area A1 to fifth area A5.

Figure 10:
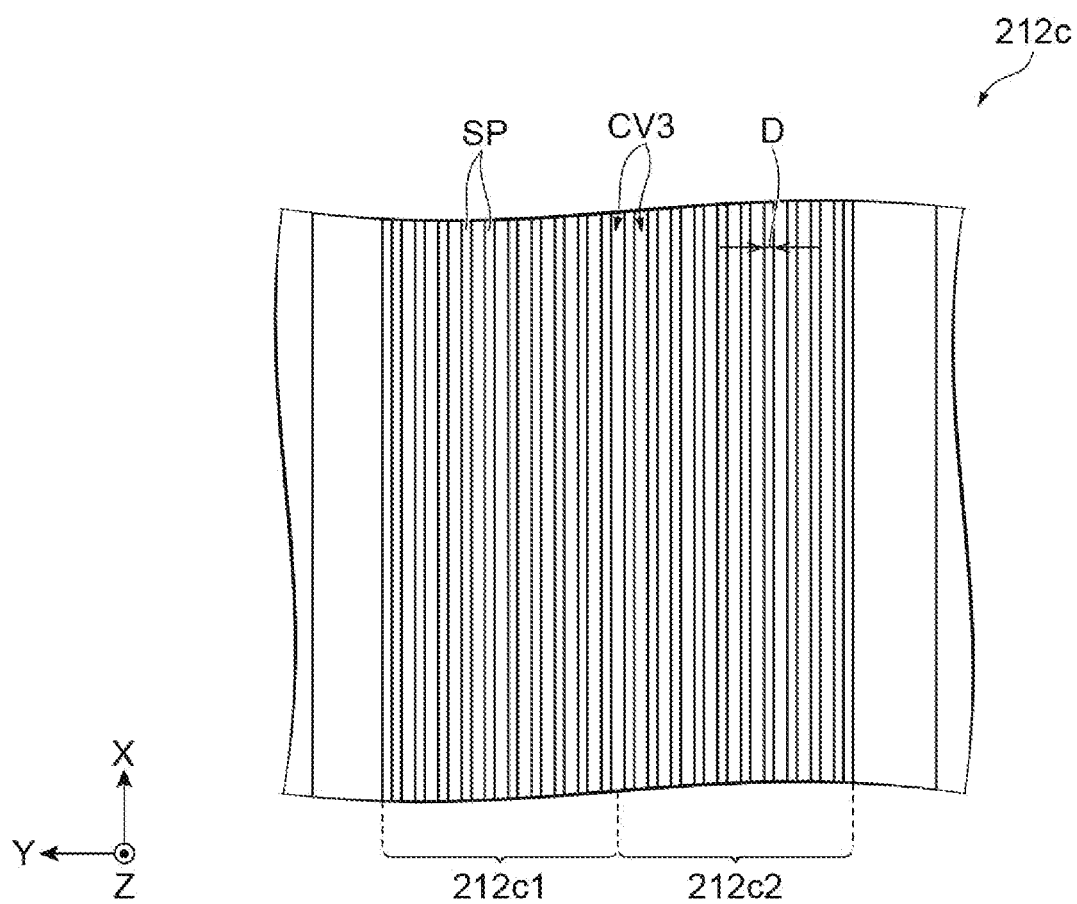
FIG. 10 is a plan view schematically showing a cladding layer of the light modulator of FIG. 9.

FIG. 10 is a plan view schematically showing a cladding layer of the light modulator of FIG. 9. As shown in FIG. 9 and FIG. 10, cladding layer 212c includes a cladding portion 212c1 and a cladding portion 212c2. Cladding portion 212c1 has the same configuration as the configuration of cladding portion 112c1 except that it has a void portion CV3 and a supporting portion SP instead of void portion CV1. Cladding portion 212c2 has the same configuration as the configuration of cladding portion 112c2 except that it has void portion CV3 and supporting portion SP instead of void portion CV2. Each of cladding portion 212c1 and cladding portion 212c2 may include a plurality of void portions CV3 and a plurality of supporting portions SP. Void portions CV3 and supporting portions SP are alternately arranged in the Y-axis direction. Supporting portion SP may be formed between adjacent void portions CV3. Each of void portion CV3 and supporting portion SP may extend in the X-axis direction.

Supporting portions SP support first III-V compound semiconductor layer 14, first core 18, and second III-V compound semiconductor layer 116 in cladding portion 212c1. Supporting portions SP support third III-V compound semiconductor layer 22, second core 20, and second III-V compound semiconductor layer 116 in cladding portion 212c2. Supporting portion SP may be a columnar portion. Supporting portion SP includes, for example, silicon. Void portion CV3 may be filled with a member having a refractive index smaller than the refractive index of first III-V compound semiconductor layer 14 or third III-V compound semiconductor layer 22.

Cladding portion 212c1 has an average refractive index smaller than the refractive index of first III-V compound semiconductor layer 14. When the refractive index of void portion CV3 is n1, the refractive index of supporting portion SP is n2, a volume fraction of void portion CV3 in cladding portion 212c1 is RV1, and a volume fraction of supporting portion SP in cladding portion 212c1 is RV2 (=1−RV1), the average refractive index na of cladding portion 212c1 can be calculated by the following equation (1).

$$na = n1 \times RV1 + n2 \times RV2 \quad (1)$$

Cladding portion 212c2 has an average refractive index smaller than the refractive index of third III-V compound semiconductor layer 22. The average refractive index of cladding portion 212c2 can be calculated in the same manner as the average refractive index of cladding portion 212c1.

A width D of each supporting portion SP in the Y-axis direction may be smaller than a width of each void portion CV3 in the Y-axis direction. When the wavelength of light L1 propagating through first core 18 and second core 20 is $\lambda$ and the refractive index of supporting portion SP is n2, width D of each supporting portion SP in the Y-axis direction may be $\lambda/n2$ or less. Width D is, for example, 0.5 μm or less.

Figure 11:
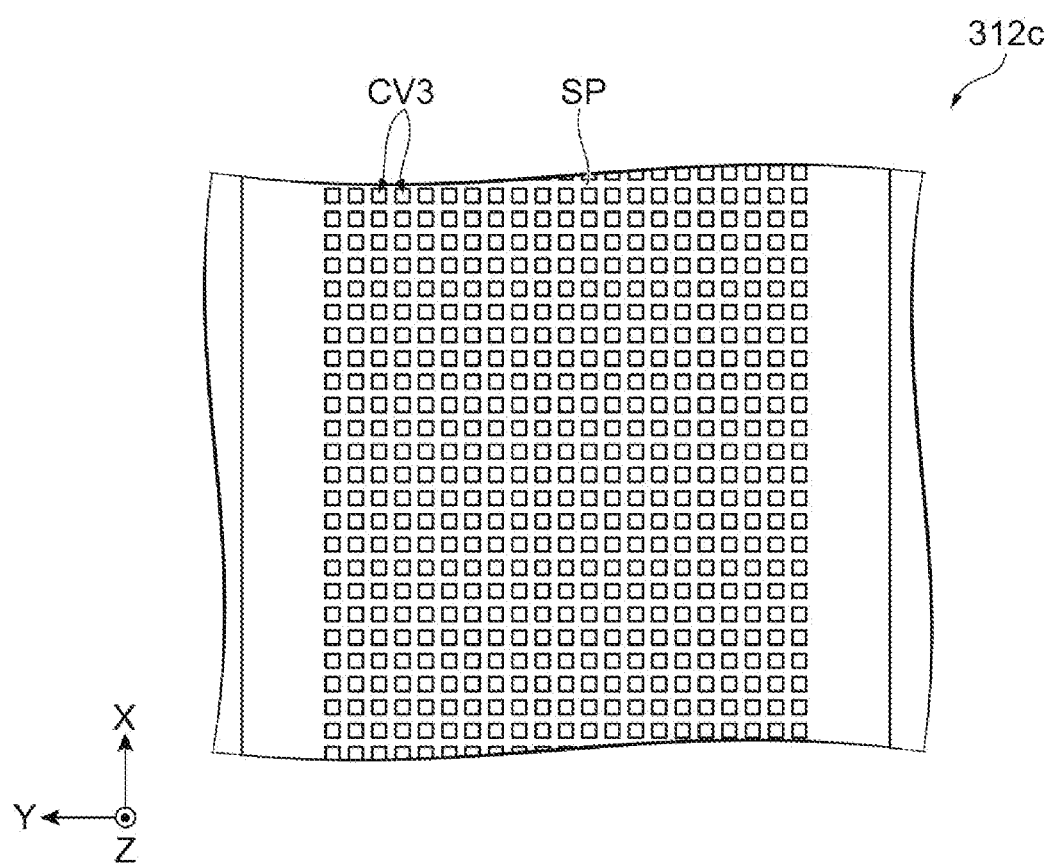
FIG. 11 is a plan view schematically showing a cladding layer according to a modification.

FIG. 11 is a plan view schematically showing a cladding layer according to a modification. Light modulator 210 may include a cladding layer 312c instead of cladding layer 212c. Cladding layer 312c has the same configuration as cladding layer 212c except that the arrangement of void portion CV3 and supporting portion SP is different. In cladding layer 312c, supporting portions SP are arranged in a lattice shape along main surface 212s of substrate 212. That is, supporting portion SP extends in the X-axis direction and the Y-axis direction. Accordingly, a plurality of void portions CV3 are arranged in a two dimensional array along main surface 212s of substrate 212. The shapes of the cross-section and the top surface of each void portion CV3 along main surface 212s of substrate 212 may be polygonal, elliptical, circular, or any other shape.

Light modulator 210 includes an electrode E16 connected to second III-V compound semiconductor layer 116. Light modulator 210 may have a ground signal ground signal ground (GSGSG) structure. A ground potential is applied to electrode E16. Second III-V compound semiconductor layer 116 of light modulator 210 has a fourth portion 116d in addition to first portion 116a to third portion 116c. Fourth portion 116d is provided on first portion 116a. Electrode E16 is connected to fourth portion 116d.

Light modulator 210 does not include III-V compound semiconductor layer 24 or III-V compound semiconductor layer 26. Thus, electrodes E11 and E14 are connected to cladding layer 212c. In light modulator 210, the side surfaces of first core 18 and second core 20 are not inclined. Light modulator 210 does not include insulating film 30.

According to light modulator 210 of this embodiment, the same effects as those of light modulator 110 can be obtained. Further, since each of cladding portion 212c1 and cladding portion 212c2 includes supporting portion SP, the mechanical strength of light modulator 210 may be improved.

Fourth Embodiment

Figure 12:
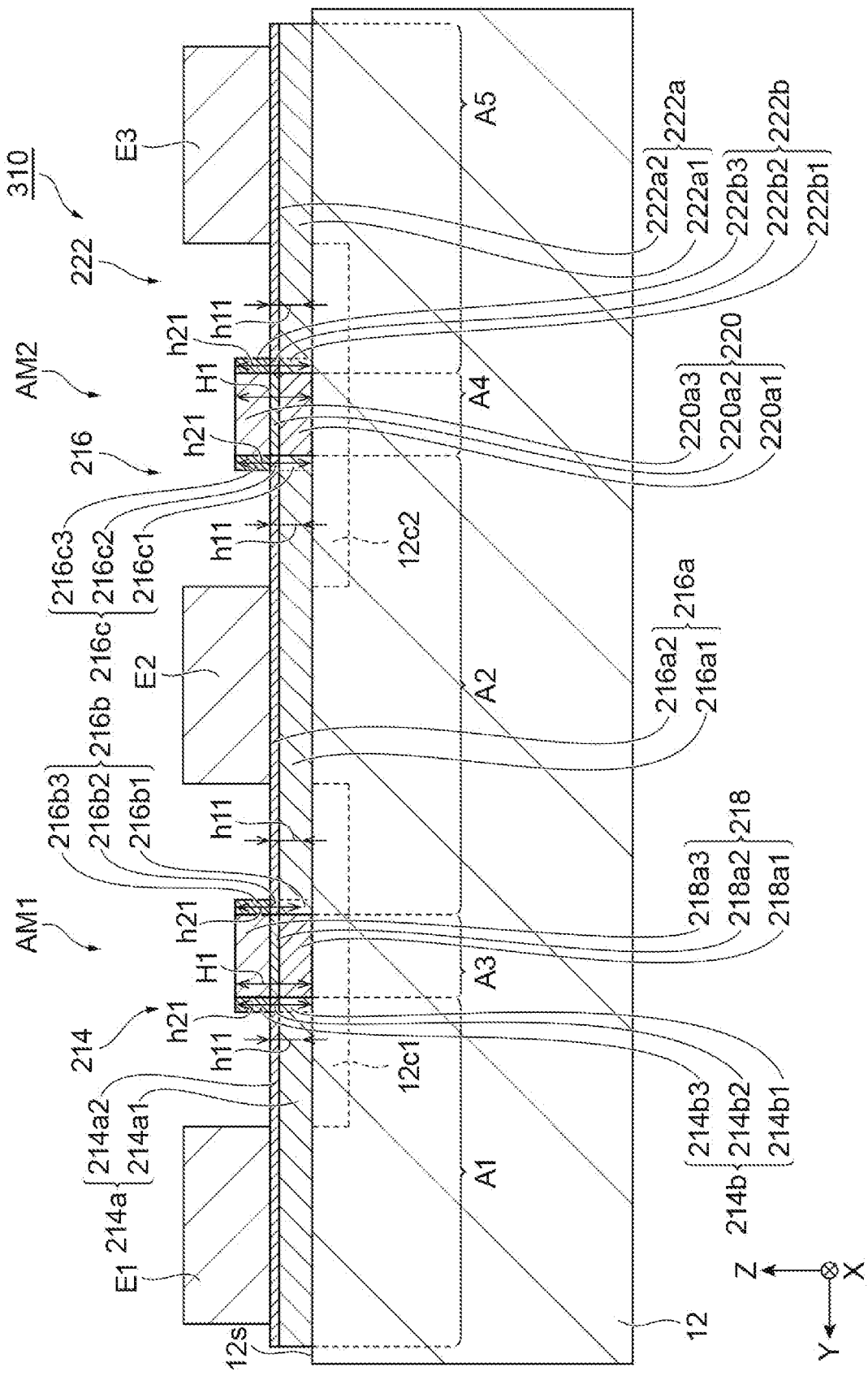
FIG. 12 is a cross-sectional view schematically showing a light modulator according to a fourth embodiment.

FIG. 12 is a cross-sectional view schematically showing a light modulator according to a fourth embodiment. A light modulator 310 shown in FIG. 12 has the same configuration as light modulator 10 shown in FIG. 2 except for the following points. Light modulator 310 includes a first III-V compound semiconductor layer 214, a second III-V compound semiconductor layer 216, and a third III-V compound semiconductor layer 222 instead of first III-V compound semiconductor layer 14, second III-V compound semiconductor layer 16, and third III-V compound semiconductor layer 22, respectively. Light modulator 310 includes a first core 218 and a second core 220 instead of first core 18 and second core 20, respectively.

First III-V compound semiconductor layer 214 includes a first portion 214a and a second portion 214b. First portion 214a has a thicknesses h11 smaller than a thicknesses H1 of first core 218 in the Z-axis direction. Second portion 214b has a thickness h21 greater than the thickness h11 of the first portion 214a in the Z-axis direction.

First portion 214a includes a first layer 214a1 and a second layer 214a2. First layer 214a1 is disposed between second layer 214a2 and substrate 12 in the Z-axis direction. First layer 214a1 has the same configuration as first portion 14a of light modulator 10 shown in FIG. 2.

Second layer 214a2 may include a group III-V compound semiconductor different from a group III-V compound semiconductor included in first layer 214a1. The group III-V compound semiconductor included in the second layer 214a2 may have an etching rate lower than an etching rate of the group III-V compound semiconductor included in first layer 214a1. In the etching, a mixed gas containing methane gas and hydrogen gas may be used. Second layer 214a2 may include a group III-V compound semiconductor including aluminum. In one example, second layer 214a2 includes InAlAs. Second layer 214a2 may have the same conductivity-type as a conductivity-type of first layer 214a1. A thickness of second layer 214a2 may be from 0.01 μm to 0.04 μm.

Second portion 214b includes a first layer 214b1, a second layer 214b2, and a third layer 214b3. First layer 214b1 is disposed between second layer 214b2 and substrate 12 in the Z-axis direction. Second layer 214b2 is disposed between first layer 214b1 and third layer 214b3 in the Z-axis direction. A portion including first layer 214b1 and third layer 214b3 has the same configuration as second portion 14b of light modulator 10 in FIG. 2.

Second layer 214b2 has the same configuration as second layer 214a2 of first portion 214a except that it has a different conductivity-type. Second layer 214b2 may have the same conductivity-type as the conductivity-type of first layer 214b1 or third layer 214b3.

Second III-V compound semiconductor layer 216 may include a first portion 216a, a second portion 216b, and a third portion 216c. First portion 216a has a thicknesses H1 smaller than the thicknesses H1 of first core 218 in the Z-axis direction. Second portion 216b has a thickness h21 greater than the thickness h11 of first portion 216a in the Z-axis direction. Third portion 216c has a thickness h21 greater than the thickness h11 of first portion 216a in the Z-axis direction.

First portion 216a includes a first layer 216a1 and a second layer 216a2. First layer 216a1 is disposed between second layer 216a2 and substrate 12 in the Z-axis direction. First layer 216a1 has the same configuration as first portion 16a of light modulator 10 shown in FIG. 2.

Second layer 216a2 has the same configuration as second layer 214a2 of first portion 214a except that it has a different conductivity-type. Second layer 216a2 may have the same conductivity-type as the conductivity-type of first layer 216a1.

Second portion 216b includes a first layer 216b1, a second layer 216b2, and a third layer 216b3. First layer 216b1 is disposed between second layer 216b2 and substrate 12 in the Z-axis direction. Second layer 216b2 is disposed between first layer 216b1 and third layer 216b3 in the Z-axis direction. A portion including first layer 216b1 and third layer 216b3 has the same configuration as second portion 16b of light modulator 10 in FIG. 2.

Second layer 216b2 has the same configuration as second layer 214a2 of first portion 214a except that it has a different conductivity-type. Second layer 216b2 may have the same conductivity-type as the conductivity-type of first layer 216b1 or third layer 216b3.

Third portion 216c includes a first layer 216c1, a second layer 216c2, and a third layer 216c3. First layer 216c1 is disposed between second layer 216c2 and substrate 12 in the Z-axis direction. Second layer 216c2 is disposed between first layer 216c1 and third layer 216c3 in the Z-axis direction. A portion including first layer 216c1 and third layer 216c3 has the same configuration as third portion 16c of light modulator 10 in FIG. 2.

Second layer 216c2 has the same configuration as second layer 214a2 of first portion 214a except that it has a different conductivity-type. Second layer 216c2 may have the same conductivity-type as the conductivity-type of first layer 216c1 or third layer 216c3.

Third III-V compound semiconductor layer 222 includes a first portion 222a and a second portion 222b. First portion 222a has a thicknesses h11 smaller than the thicknesses H1 of second core 220 in the Z-axis direction. Second portion 222b has a thickness h21 greater than the thickness h11 of first portion 222a in the Z-axis direction.

First portion 222a includes a first layer 222a1 and a second layer 222a2. First layer 222a1 is disposed between second layer 222a2 and substrate 12 in the Z-axis direction. First layer 222a1 has the same configuration as first portion 22a of light modulator 10 shown in FIG. 2.

Second layer 222a2 has the same configuration as second layer 214a2 of first portion 214a except that it has a different conductivity-type. Second layer 222a2 may have the same conductivity-type as the conductivity-type of first layer 222a1.

Second portion 222b includes a first layer 222b1, a second layer 222b2, and a third layer 222b3. First layer 222b1 is disposed between second layer 222b2 and substrate 12 in the Z-axis direction. Second layer 222b2 is disposed between first layer 222b1 and third layer 222b3 in the Z-axis direction. A portion including first layer 222b1 and third layer 222b3 has the same configuration as second portion 22b of light modulator 10 in FIG. 2.

Second layer 222b2 has the same configuration as second layer 214a2 of first portion 214a except that it has a different conductivity-type. Second layer 222b2 may have the same conductivity-type as the conductivity-type of first layer 222b1 or third layer 222b3.

First core 218 includes a first layer 218a1, a second layer 218a2, and a third layer 218a3. First layer 218a1 is disposed between second layer 218a2 and substrate 12 in the Z-axis direction. Second layer 218a2 is disposed between first layer 218a1 and third layer 218a3 in the Z-axis direction. A portion including first layer 218a1 and third layer 218a3 has the same configuration as first core 18 of light modulator 10 of FIG. 2.

Second layer 218a2 has the same configuration as that of second layer 214a2 of first portion 214a except that it has a different conductivity-type. Second layer 218a2 may have the same conductivity-type as the conductivity-type of first layer 218a1 or third layer 218a3.

Second core 220 includes a first layer 220a1, a second layer 220a2, and a third layer 220a3. First layer 220a1 is disposed between second layer 220a2 and substrate 12 in the Z-axis direction. Second layer 220a2 is disposed between first layer 220a1 and third layer 220a3 in the Z-axis direction. A portion including first layer 220a1 and third layer 220a3 has the same configuration as second core 20 of light modulator 10 of FIG. 2.

Second layer 220a2 has the same configuration as that of second layer 214a2 of first portion 214a except that it has a different conductivity-type. Second layer 220a2 may have the same conductivity-type as the conductivity-type of first layer 220a1 or third layer 220a3.

Light modulator 310 can be manufactured by the same method as the manufacturing method of light modulator 10. In FIG. 4, III-V compound semiconductor layer 102 includes a first semiconductor layer, a second semiconductor layer, and an etching stop layer between the first semiconductor layer and the second semiconductor layer. From the first semiconductor layer, first layer 214a1, first layer 214b1, first layer 218a1, first layer 216b1, first layer 216a1, first layer 216c1, first layer 220a1, first layer 222b1, and first layer 222a1 are formed. From the etching stop layer, second layer 214a2, second layer 214b2, second layer 218a2, second layer 216a2, second layer 216b2, second layer 216c2, second layer 220a2, second layer 222b2, and second layer 222a2 are formed. Third layer 214b3, third layer 218a3, third layer 216b3, third layer 216c3, third layer 220a3, and third layer 222b3 are formed from the second semiconductor layer.

According to light modulator 310, the same effects as those of light modulator 10 can be obtained. Further, when first portion 214a is formed by etching, second layer 214a2 of first portion 214a functions as an etching stop layer. Therefore, the thickness h11 of first portion 214a can be controlled with high accuracy. For example, high in-plane uniformity can be obtained across main surface 12s of substrate 12. First portion 214a may be formed by etching using a mixed gas including methane gas and hydrogen gas. When the thickness of the second layer 214a2 of first portion 214a is 0.01 µm or greater, the function of protecting first layer 214a1 during etching is enhanced. When the thickness of second layer 214a2 is 0.04 µm or less, the influence of the second layer 214a2 on light confinement and light modulation can be reduced. Second layer 216a2 and second layer 222a2 also have the same effects as second layer 214a2.

Fifth Embodiment

Figure 13:
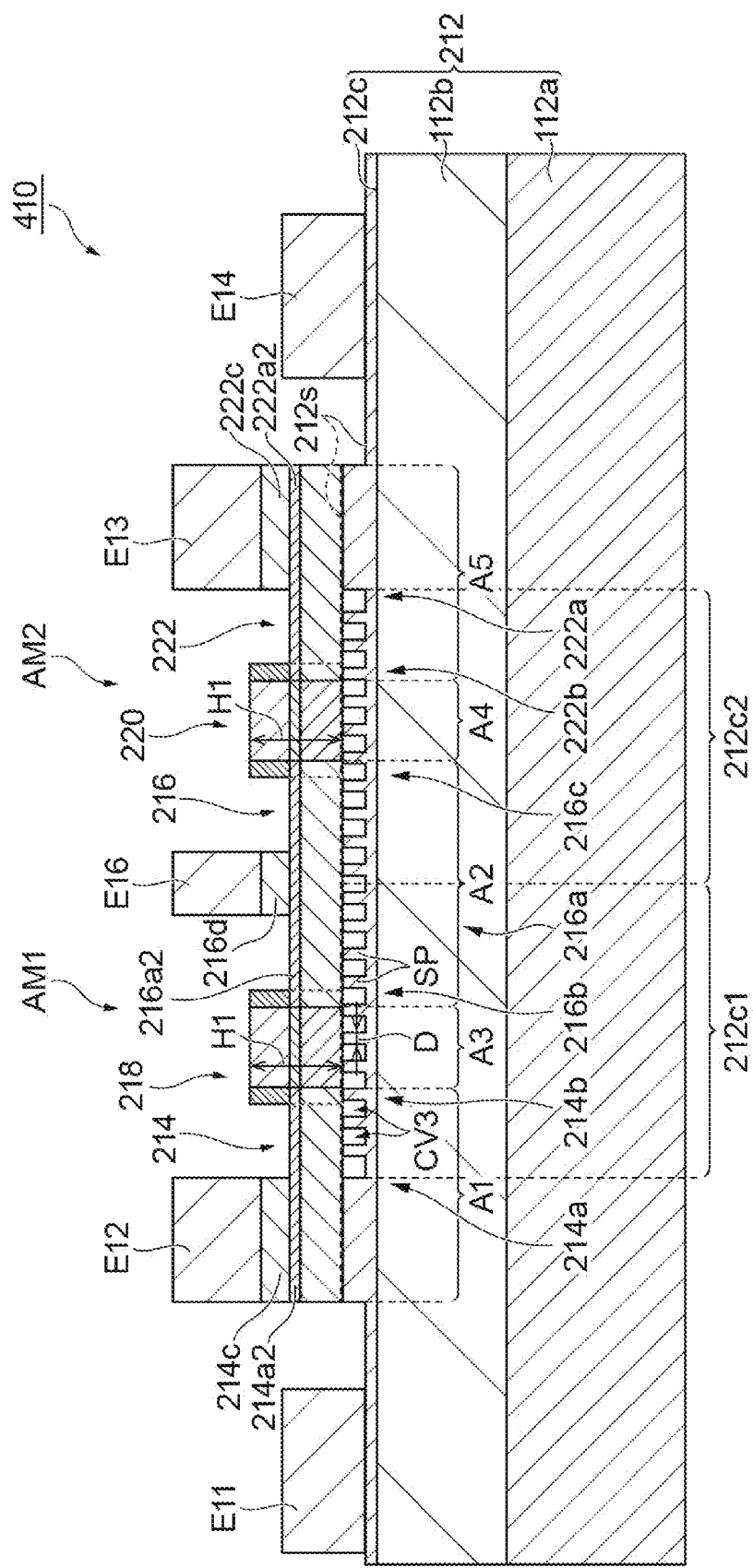
FIG. 13 is a cross-sectional view schematically showing a light modulator according to a fifth embodiment.

FIG. 13 is a cross-sectional view schematically showing a light modulator according to a fifth embodiment. A light modulator 410 shown in FIG. 13 has the same configuration as light modulator 210 shown in FIG. 9 except for the following points. Light modulator 410 includes a first III-V compound semiconductor layer 214, a second III-V compound semiconductor layer 216, and a third III-V compound semiconductor layer 222 instead of first III-V compound semiconductor layer 14, second III-V compound semiconductor layer 16, and third III-V compound semiconductor layer 22, respectively. Light modulator 410 includes a first core 218 and a second core 220 instead of first core 18 and second core 20, respectively.

In the present embodiment, first III-V compound semiconductor layer 214 may include a third portion 214c in addition to a first portion 214a and a second portion 214b. Third portion 214c is provided on a second layer 214a2 of first portion 214a. An electrode E12 is connected to third portion 214c.

In the present embodiment, second III-V compound semiconductor layer 216 may include a fourth portion 216d in addition to the first portion 216a to third portion 216c. Fourth portion 216d is provided on a second layer 216a2 of first portion 216a. An electrode E16 is connected to fourth portion 216d.

In the present embodiment, third III-V compound semiconductor layer 222 may include a third portion 222c in addition to a first portion 222a and a second portion 222b. Third portion 222c is provided on a second layer 222a2 of first portion 222a. An electrode E13 is connected to third portion 222c.

According to light modulator 410, the same effects as those of light modulator 210 can be obtained. Further, it is possible to obtain the same effects as those obtained by second layer 214a2, second layer 216a2, and second layer 222a2 of light modulator 310.

Although the preferred embodiments of the present disclosure have been described in detail above, the present disclosure is not limited to the above embodiments. The constituent elements of the embodiments may be arbitrarily combined.

For example, light modulator 10 may include substrate 112 or substrate 212 instead of substrate 12. In light modulators 10 and 210, side surfaces of first core 18 and second core 20 may be inclined as in light modulator 110. Light modulator 10 may include second III-V compound semiconductor layer 116 of a second conductivity-type instead of second III-V compound semiconductor layer 16 of a first conductivity-type. Light modulators 10 and 210 may include insulating film 30. In light modulator 10, first III-V compound semiconductor layer 14 may include third portion 14c. In this case, electrode E1 is connected to third portion 14c. In light modulator 10, third III-V compound semiconductor layer 22 may include third portion 22c. In this case, electrode E3 is connected to third portion 22c.

Hereinafter, simulation results of the optical confinement factors of a first waveguide structure and a second waveguide structure will be described. The simulation results do not limit the present disclosure.

Figure 14:
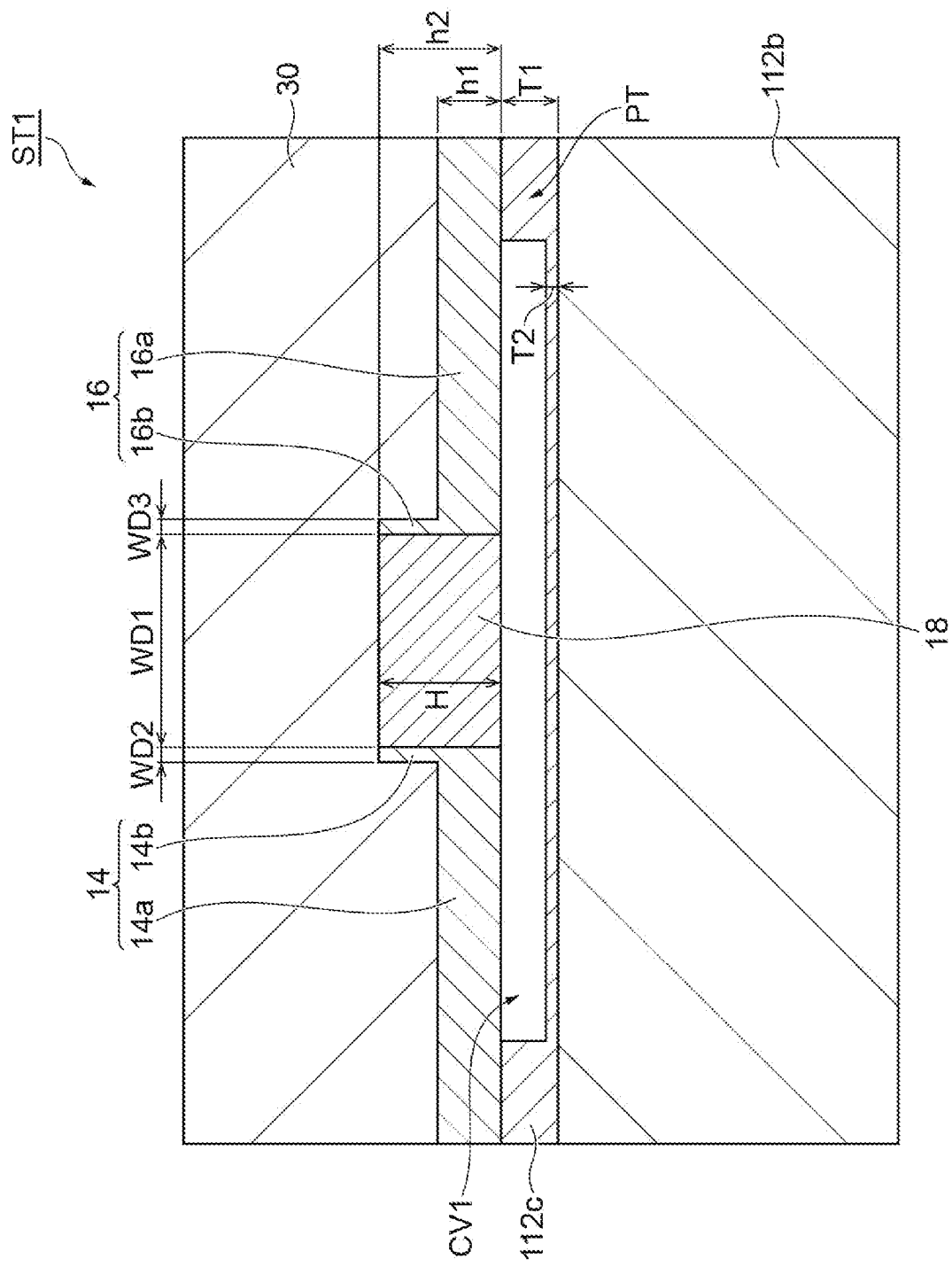
FIG. 14 is a cross-sectional view schematically showing a first waveguide structure.

FIG. 14 is a cross-sectional view schematically showing the first waveguide structure. FIG. 14 shows a cross section (corresponding to FIG. 2) orthogonal to the extending direction of first core 18. A first waveguide structure ST1 shown in FIG. 14 has the following structure:

Insulating layer 112b: $SiO_2$ layer.
Cladding layer 112c: patterned silicon layer and void portion CV1. The thickness T1 of the silicon layer in pattern portion PT is 0.22 µm. The thickness T2 of the silicon layer located under void portion CV1 is 0.05 µm.
First core 18: semi-insulating InGaAsP layer. The thickness H is 0.6 µm. A width WD1 is 0.5 µm.
First III-V compound semiconductor layer 14: n-InGaAsP layer. The thickness h1 of first portion 14a is 0.3 µm. The thickness h2 of second portion 14b is 0.6 µm. A width WD2 of second portion 14b is 0.05 µm.
Second III-V compound semiconductor layer 16: n-InGaAsP layer. The thickness h1 of first portion 16a is 0.3 µm. The thickness h2 of second portion 16b is 0.3 µm. A width WD3 of second portion 16b is 0.05 µm.
Insulating film 30: $SiN_x$ film.

Figure 15:
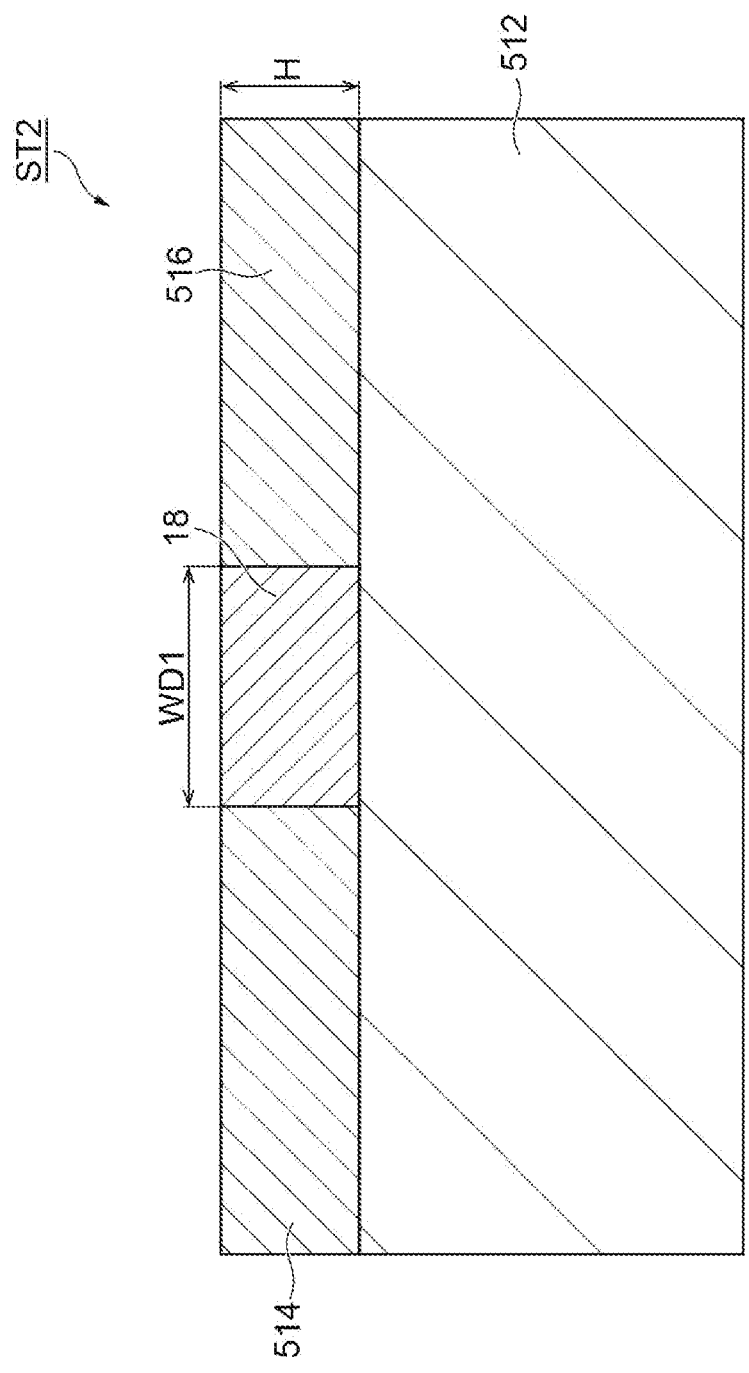
FIG. 15 is a cross-sectional view schematically showing a second waveguide structure.

FIG. 15 is a cross-sectional view schematically showing a second waveguide structure. FIG. 15 shows a cross-section orthogonal to the extending direction of first core 18. A second waveguide structure ST2 shown in FIG. 15 has the following structure:

Substrate 512: semi-insulating InP substrate.
First core 18: semi-insulating InGaAsP layer. The thickness H is 0.6 µm. Width WD1 is 0.5 µm.
III-V compound semiconductor layer 514: n-InP layer. The thickness is 0.6 µm.
III-V compound semiconductor layer 516: n-InP layer. The thickness is 0.6 µm.
First core 18, III-V compound semiconductor layer 514, and III-V compound semiconductor layer 516 are exposed to air.

The optical confinement factors of first waveguide structure ST1 and second waveguide structure ST2 were calculated by simulation. The wavelength λ of light L1 used in the simulation is 1.55 µm. As a result of the simulation, the optical confinement factor of first waveguide structure ST1 to first core 18 was 78%. The optical confinement factor of second waveguide structure ST2 to first core 18 was 52%. It was found that first waveguide structure ST1 had better optical confinement performance than second waveguide structure ST2.

The embodiments disclosed herein are to be considered in all respects as illustrative and not restrictive. The scope of the present invention is defined not by the above-described meaning but by the scope of claims, and is intended to include meanings equivalent to the scope of claims and all modifications within the scope.

What is claimed is:

1. A light modulator comprising:
a substrate including a cladding portion and a main surface having a first area, a second area, and a third area, the first area, the second area, and the third area each extending in a first direction along the main surface, the third area being disposed between the first area and the second area, and the cladding portion being located under the main surface within the substrate and under the third area;
a first III-V compound semiconductor layer of a first conductivity-type disposed on the first area and including a first portion and a second portion;
a second III-V compound semiconductor layer of the first conductivity-type or a second conductivity-type disposed on the second area;
a core disposed on the third area and containing a III-V compound semiconductor; and
an electrode connected to the first III-V compound semiconductor layer,
wherein the first portion has a thickness smaller than a thickness of the core in a second direction orthogonal to the main surface,
wherein the second portion has a thickness larger than the thickness of the first portion in the second direction, and the second portion is disposed between the first portion and the core,
wherein the cladding portion has a refractive index smaller than a refractive index of the first III-V compound semiconductor layer,
wherein the cladding portion includes a plurality of void portions and a plurality of supporting portions, each of the plurality of supporting portions supporting the core, and
wherein the plurality of void portions and the plurality of supporting portions are alternately arranged in a third direction orthogonal to both the first direction and the second direction.

2. The light modulator according to claim 1, wherein the second III-V compound semiconductor layer has the first conductivity-type, and the first conductivity-type is n-type.

3. The light modulator according to claim 1, wherein
the main surface includes a fourth area and a fifth area, the fourth area and the fifth area each extending in the first direction, the fourth area being disposed between the second area and the fifth area,
the core is a first core,
the light modulator further comprises:
a second core disposed on the fourth area and containing a III-V compound semiconductor; and
a third III-V compound semiconductor layer of the first conductivity-type disposed on the fifth area, and
the second III-V compound semiconductor layer has the second conductivity-type, the first conductivity-type is n-type, and the second conductivity-type is p-type.

4. The light modulator according to claim 3, wherein in the third direction, a length of the second III-V compound semiconductor layer is smaller than a total length of the first III-V compound semiconductor layer and the third III-V compound semiconductor layer.

5. The light modulator according to claim 1, wherein
the first portion includes a first layer and a second layer,
the first layer is disposed between the second layer and the substrate in the second direction, and
the second layer includes a III-V compound semiconductor different from the III-V compound semiconductor included in the first layer.

6. The light modulator according to claim 5, wherein the second layer includes a III-V compound semiconductor including aluminum.

7. The light modulator according to claim 5, wherein a thickness in the second direction of the second layer is from 0.01 µm to 0.04 µm.

8. The light modulator according to claim 1, wherein a width of the second portion in the third direction is smaller than a width of the first portion in the third direction.

9. The light modulator according to claim 1, wherein a width of the second portion in the third direction is smaller than a width of the core in the third direction.

10. The light modulator according to claim 1, wherein a width of the second portion in the third direction is from 0.1 µm to 2 µm.

11. The light modulator according to claim 1, wherein the thickness of the first portion is from 0.1 µm to 1 µm.

12. The light modulator according to claim 1, wherein the electrode is connected to the first portion and away from the second portion.

13. The light modulator according to claim 12, wherein a distance between the electrode and the second portion is from 1 µm to 5 µm.

14. The light modulator according to claim 1, wherein the first III-V compound semiconductor layer includes a third portion, wherein the first portion is disposed between the second portion and the third portion, wherein the third portion has a thickness larger than the thickness of the first portion in the second direction.

15. The light modulator according to claim 14, wherein the electrode is connected to the third portion and away from the first portion and the second portion.

16. The light modulator according to claim 1, wherein the core is an arm waveguide of a Mach-Zehnder modulator.

17. The light modulator according to claim 1, wherein an upper surface of the core is a (100) plane, a (110) plane, or a (111) plane.

* * * * *